United States Patent
Saxe

(10) Patent No.: US 12,526,289 B2
(45) Date of Patent: Jan. 13, 2026

(54) METHODS AND APPARATUS FOR MACHINE LEARNING TO GENERATE A DECISION TREE DATABASE TO IDENTIFY COMMANDS SIMILAR TO A COMMAND OF INTEREST

(71) Applicant: Sophos Limited, Abingdon (GB)

(72) Inventor: Joshua Daniel Saxe, Wichita, KS (US)

(73) Assignee: Sophos Limited, Abingdon (GB)

( * ) Notice: Subject to any disclaimer, the term of this patent is extended or adjusted under 35 U.S.C. 154(b) by 439 days.

(21) Appl. No.: 17/746,471

(22) Filed: May 17, 2022

(65) Prior Publication Data

US 2023/0403286 A1 Dec. 14, 2023

(51) Int. Cl.
    *G06F 21/55* (2013.01)
    *G06F 21/56* (2013.01)
    *H04L 9/40* (2022.01)

(52) U.S. Cl.
    CPC ........ *H04L 63/1416* (2013.01); *G06F 21/554* (2013.01); *G06F 21/562* (2013.01); *H04L 63/1425* (2013.01)

(58) Field of Classification Search
    CPC ............................ G06F 21/554; G06F 21/562
    See application file for complete search history.

(56) References Cited

U.S. PATENT DOCUMENTS

| | | | |
|---|---|---|---|
| 5,276,789 A | 1/1994 | Besaw et al. | |
| 5,471,399 A | 11/1995 | Tanaka et al. | |
| 5,793,974 A | 8/1998 | Messinger | |
| 5,857,190 A | 1/1999 | Brown | |
| 5,867,659 A | 2/1999 | Otteson | |
| 5,958,012 A | 9/1999 | Battat et al. | |

(Continued)

FOREIGN PATENT DOCUMENTS

| | | |
|---|---|---|
| CN | 103914657 A | 7/2014 |
| CN | 104504337 A | 4/2015 |

(Continued)

OTHER PUBLICATIONS

International Search Report and Written Opinion for International Application No. PCT/GB2023/051290, mailed on Oct. 2, 2023, 16 pages.

(Continued)

*Primary Examiner* — David J Pearson

(74) *Attorney, Agent, or Firm* — COOLEY LLP

(57) ABSTRACT

A potentially malicious command including a plurality of features is received. Additionally, a plurality of nodes included in a decision tree are traversed, based on the plurality of features, to identify a leaf node included in the plurality of nodes. The leaf node is associated with (1) a first set of similar commands, each similar command from the first set of similar commands including the plurality of features, and (2) a second set of similar commands from the first set of similar commands and that were previously detected. Additionally, a probability that the potentially malicious command will be escalated as potentially malicious is determined based on the first set of similar commands and the second set of similar commands. Additionally, a first indication quantifying the first set of similar commands, a second indication quantifying the second set of similar commands, and the probability are caused to be displayed.

20 Claims, 8 Drawing Sheets

(56) References Cited

U.S. PATENT DOCUMENTS

| | | |
|---|---|---|
| 6,225,999 B1 | 5/2001 | Jain et al. |
| 6,347,336 B1 | 2/2002 | Song et al. |
| 6,714,976 B1 | 3/2004 | Wilson et al. |
| 6,885,387 B1 | 4/2005 | Machida |
| 6,885,641 B1 | 4/2005 | Chan et al. |
| 7,155,514 B1 | 12/2006 | Milford |
| 7,194,769 B2 | 3/2007 | Lippmann et al. |
| 7,594,270 B2 | 9/2009 | Church et al. |
| 7,624,448 B2 | 11/2009 | Coffman |
| 7,934,257 B1 | 4/2011 | Kienzle et al. |
| 7,945,787 B2 | 5/2011 | Gassoway |
| 8,181,244 B2 | 5/2012 | Boney |
| 8,201,243 B2 | 6/2012 | Boney |
| 8,225,394 B2 | 7/2012 | Gassoway |
| 8,375,450 B1 * | 2/2013 | Oliver .................. G06F 21/564 713/181 |
| 8,401,982 B1 * | 3/2013 | Satish .................. G06N 20/00 706/20 |
| 8,418,250 B2 | 4/2013 | Morris et al. |
| 8,499,204 B2 | 7/2013 | Lovy et al. |
| 8,578,490 B2 | 11/2013 | Moran |
| 8,607,347 B2 | 12/2013 | Harris et al. |
| 8,719,932 B2 | 5/2014 | Boney |
| 8,726,389 B2 | 5/2014 | Morris et al. |
| 8,763,123 B2 | 6/2014 | Morris et al. |
| 8,779,921 B1 | 7/2014 | Curtiss |
| 8,805,995 B1 | 8/2014 | Oliver |
| 8,813,236 B1 | 8/2014 | Saha et al. |
| 8,856,505 B2 | 10/2014 | Schneider |
| 8,881,288 B1 | 11/2014 | Levy et al. |
| 9,141,790 B2 | 9/2015 | Roundy et al. |
| 9,185,124 B2 | 11/2015 | Chakraborty |
| 9,189,634 B2 | 11/2015 | Lin |
| 9,235,716 B1 | 1/2016 | Brucker et al. |
| 9,256,739 B1 | 2/2016 | Roundy et al. |
| 9,390,263 B2 | 7/2016 | Thomas |
| 9,392,015 B2 | 7/2016 | Thomas |
| 9,411,953 B1 | 8/2016 | Kane et al. |
| 9,413,721 B2 | 8/2016 | Morris et al. |
| 9,419,989 B2 | 8/2016 | Harris et al. |
| 9,516,052 B1 | 12/2016 | Chauhan et al. |
| 9,571,512 B2 | 2/2017 | Ray et al. |
| 9,578,045 B2 | 2/2017 | Jaroch et al. |
| 9,602,530 B2 | 3/2017 | Ellis et al. |
| 9,690,938 B1 | 6/2017 | Saxe et al. |
| 9,727,726 B1 | 8/2017 | Allen |
| 9,736,182 B1 | 8/2017 | Madhukar et al. |
| 9,774,613 B2 | 9/2017 | Thomas et al. |
| 9,842,219 B1 | 12/2017 | Gates et al. |
| 9,898,604 B2 | 2/2018 | Fang et al. |
| 9,917,851 B2 | 3/2018 | Ray |
| 9,917,859 B2 | 3/2018 | Harris et al. |
| 9,934,378 B1 | 4/2018 | Hotta et al. |
| 9,940,459 B1 * | 4/2018 | Saxe .................. G06F 21/561 |
| 9,965,627 B2 | 5/2018 | Ray et al. |
| 9,967,282 B2 | 5/2018 | Thomas et al. |
| 9,967,283 B2 | 5/2018 | Ray et al. |
| 10,061,922 B2 | 8/2018 | Altman et al. |
| 10,075,462 B2 | 9/2018 | Mehta et al. |
| 10,078,571 B2 | 9/2018 | Altman et al. |
| 10,120,998 B2 | 11/2018 | Ghosh et al. |
| 10,122,687 B2 | 11/2018 | Thomas et al. |
| 10,122,753 B2 | 11/2018 | Thomas |
| 10,181,034 B1 | 1/2019 | Harrison et al. |
| 10,205,735 B2 | 2/2019 | Apostolopoulos |
| 10,257,224 B2 | 4/2019 | Jaroch et al. |
| 10,284,587 B1 | 5/2019 | Schlatter et al. |
| 10,284,591 B2 | 5/2019 | Giuliani et al. |
| 10,333,962 B1 | 6/2019 | Brandwine et al. |
| 10,397,261 B2 | 8/2019 | Ikuse et al. |
| 10,440,036 B2 | 10/2019 | Pal et al. |
| 10,489,587 B1 * | 11/2019 | Kennedy .................. G06N 5/045 |
| 10,581,886 B1 | 3/2020 | Sharifi Mehr |
| 10,599,844 B2 | 3/2020 | Schmidtler et al. |
| 10,791,131 B2 | 9/2020 | Nor et al. |
| 10,817,604 B1 | 10/2020 | Kimball et al. |
| 10,887,331 B2 | 1/2021 | Nomura et al. |
| 10,938,838 B2 | 3/2021 | Saxe et al. |
| 10,970,396 B2 | 4/2021 | Gezalov et al. |
| 10,972,485 B2 | 4/2021 | Ladnai et al. |
| 11,016,964 B1 | 5/2021 | Hinegardner et al. |
| 11,183,175 B2 | 11/2021 | Larson et al. |
| 11,269,872 B1 | 3/2022 | Moo et al. |
| 11,620,379 B1 * | 4/2023 | Hegde .................. G06N 3/04 706/23 |
| 11,755,974 B2 | 9/2023 | Saxe et al. |
| 12,130,923 B2 | 10/2024 | Lee et al. |
| 12,204,870 B2 | 1/2025 | Saxe |
| 12,265,526 B2 | 4/2025 | Saxe et al. |
| 12,406,209 B1 * | 9/2025 | Shah .................. G06N 20/20 |
| 2002/0113816 A1 | 8/2002 | Mitchell et al. |
| 2003/0046390 A1 | 3/2003 | Ball et al. |
| 2003/0146929 A1 | 8/2003 | Baldwin et al. |
| 2003/0159069 A1 | 8/2003 | Choi et al. |
| 2003/0172294 A1 | 9/2003 | Judge |
| 2004/0006652 A1 | 1/2004 | Prall et al. |
| 2004/0049693 A1 | 3/2004 | Douglas |
| 2004/0064545 A1 | 4/2004 | Miyake |
| 2004/0205474 A1 * | 10/2004 | Eskin .................. H04L 63/1416 713/188 |
| 2005/0055641 A1 | 3/2005 | Machida |
| 2005/0071482 A1 | 3/2005 | Gopisetty et al. |
| 2005/0262569 A1 | 11/2005 | Shay |
| 2007/0150957 A1 | 6/2007 | Hartrell et al. |
| 2008/0134142 A1 | 6/2008 | Nathan et al. |
| 2009/0044024 A1 | 2/2009 | Oberheide et al. |
| 2009/0077664 A1 | 3/2009 | Hsu et al. |
| 2009/0300166 A1 | 12/2009 | Chen et al. |
| 2009/0328210 A1 | 12/2009 | Khachaturov et al. |
| 2010/0094800 A1 * | 4/2010 | Sharp .................. G06N 5/02 706/55 |
| 2010/0287229 A1 | 11/2010 | Hauser |
| 2011/0016208 A1 | 1/2011 | Jeong et al. |
| 2011/0023120 A1 | 1/2011 | Dai et al. |
| 2011/0162070 A1 * | 6/2011 | Krasser .................. G06F 21/564 706/20 |
| 2011/0185431 A1 | 7/2011 | Deraison |
| 2011/0196964 A1 | 8/2011 | Natarajan et al. |
| 2011/0246753 A1 | 10/2011 | Thomas |
| 2012/0198806 A1 | 8/2012 | Shay et al. |
| 2013/0036472 A1 | 2/2013 | Aziz |
| 2013/0104235 A1 | 4/2013 | Fossen et al. |
| 2013/0117848 A1 | 5/2013 | Golshan et al. |
| 2013/0179460 A1 | 7/2013 | Acuña et al. |
| 2013/0283382 A1 | 10/2013 | Kim et al. |
| 2013/0304676 A1 * | 11/2013 | Gupta .................. G06N 5/043 706/12 |
| 2014/0040245 A1 | 2/2014 | Rubinstein et al. |
| 2014/0075557 A1 | 3/2014 | Balabine et al. |
| 2014/0143825 A1 | 5/2014 | Behrendt et al. |
| 2014/0181805 A1 | 6/2014 | Zaitsev |
| 2014/0223563 A1 | 8/2014 | Durie et al. |
| 2014/0325650 A1 | 10/2014 | Pavlyushchik |
| 2014/0359768 A1 | 12/2014 | Miliefsky |
| 2015/0096025 A1 | 4/2015 | Ismael |
| 2015/0135262 A1 | 5/2015 | Porat et al. |
| 2015/0293954 A1 | 10/2015 | Hsiao et al. |
| 2015/0294244 A1 | 10/2015 | Bade et al. |
| 2015/0310213 A1 | 10/2015 | Ronen et al. |
| 2015/0312267 A1 | 10/2015 | Thomas |
| 2015/0319261 A1 | 11/2015 | Lonas et al. |
| 2016/0055337 A1 | 2/2016 | El-Moussa |
| 2016/0078225 A1 | 3/2016 | Ray et al. |
| 2016/0127401 A1 | 5/2016 | Chauhan et al. |
| 2016/0173510 A1 | 6/2016 | Harris et al. |
| 2016/0191554 A1 | 6/2016 | Kaminsky |
| 2016/0215933 A1 | 7/2016 | Skelton et al. |
| 2016/0218933 A1 | 7/2016 | Porras et al. |
| 2016/0267267 A1 | 9/2016 | Hu et al. |
| 2016/0283715 A1 | 9/2016 | Duke et al. |
| 2016/0292016 A1 | 10/2016 | Bussard et al. |
| 2016/0292579 A1 * | 10/2016 | Parikh .................. G06F 9/46 |
| 2017/0031565 A1 | 2/2017 | Chauhan et al. |
| 2017/0063896 A1 | 3/2017 | Muddu et al. |

(56) References Cited

U.S. PATENT DOCUMENTS

| | | | |
|---|---|---|---|
| 2017/0063899 A1 | 3/2017 | Muddu et al. | |
| 2017/0063903 A1 | 3/2017 | Muddu et al. | |
| 2017/0083703 A1 | 3/2017 | Abbasi et al. | |
| 2017/0118228 A1 | 4/2017 | Cp et al. | |
| 2017/0134397 A1* | 5/2017 | Dennison | G06F 16/9535 |
| 2017/0244762 A1 | 8/2017 | Kinder et al. | |
| 2017/0339178 A1 | 11/2017 | Mahaffey et al. | |
| 2017/0346835 A1 | 11/2017 | Thomas et al. | |
| 2017/0359373 A1 | 12/2017 | Jaladi et al. | |
| 2018/0091535 A1 | 3/2018 | Chrosziel et al. | |
| 2018/0096146 A1* | 4/2018 | Hao | G06N 5/04 |
| 2018/0203998 A1 | 7/2018 | Maisel et al. | |
| 2018/0219888 A1 | 8/2018 | Apostolopoulos | |
| 2018/0234385 A1* | 8/2018 | O'Neil | H04L 41/145 |
| 2018/0253458 A1 | 9/2018 | Goyal et al. | |
| 2018/0307833 A1 | 10/2018 | Noeth et al. | |
| 2018/0332005 A1 | 11/2018 | Ettema et al. | |
| 2018/0357266 A1 | 12/2018 | Zenger et al. | |
| 2019/0007435 A1 | 1/2019 | Pritzkau et al. | |
| 2019/0034410 A1 | 1/2019 | Hudson et al. | |
| 2019/0034540 A1 | 1/2019 | Perkins et al. | |
| 2019/0034624 A1 | 1/2019 | Chen et al. | |
| 2019/0050567 A1 | 2/2019 | Chistyakov et al. | |
| 2019/0068627 A1 | 2/2019 | Thampy | |
| 2019/0081983 A1 | 3/2019 | Teal | |
| 2019/0114539 A1 | 4/2019 | Chistyakov et al. | |
| 2019/0121973 A1 | 4/2019 | Li et al. | |
| 2019/0205322 A1 | 7/2019 | Dobrynin et al. | |
| 2019/0220595 A1* | 7/2019 | Gehweiler | G06F 16/285 |
| 2019/0260779 A1 | 8/2019 | Bazalgette et al. | |
| 2019/0260804 A1 | 8/2019 | Beck et al. | |
| 2019/0311297 A1 | 10/2019 | Gapper | |
| 2019/0318089 A1 | 10/2019 | Wang | |
| 2019/0334931 A1* | 10/2019 | Arlitt | H04L 63/1425 |
| 2019/0342330 A1 | 11/2019 | Wu et al. | |
| 2019/0363925 A1 | 11/2019 | Davis et al. | |
| 2019/0384897 A1 | 12/2019 | Urmanov et al. | |
| 2020/0074078 A1 | 3/2020 | Saxe et al. | |
| 2020/0074336 A1 | 3/2020 | Saxe et al. | |
| 2020/0074360 A1 | 3/2020 | Humphries et al. | |
| 2020/0076833 A1 | 3/2020 | Ladnai et al. | |
| 2020/0076834 A1 | 3/2020 | Ladnai et al. | |
| 2020/0233960 A1* | 7/2020 | Copty | G06N 5/01 |
| 2020/0301916 A1 | 9/2020 | Nguyen et al. | |
| 2020/0304528 A1 | 9/2020 | Ackerman et al. | |
| 2020/0382534 A1* | 12/2020 | Simanovsky | G06F 21/552 |
| 2021/0049158 A1 | 2/2021 | Jiao et al. | |
| 2021/0165725 A1* | 6/2021 | Kalamkar | G06F 18/2433 |
| 2021/0211440 A1 | 7/2021 | Saxe et al. | |
| 2021/0211441 A1 | 7/2021 | Humphries et al. | |
| 2021/0250366 A1 | 8/2021 | Ladnai et al. | |
| 2021/0304013 A1* | 9/2021 | Zhang | G06N 5/01 |
| 2021/0406253 A1 | 12/2021 | Agarwal | |
| 2022/0217166 A1 | 7/2022 | Ladnai et al. | |
| 2022/0217167 A1 | 7/2022 | Saxe et al. | |
| 2022/0292085 A1 | 9/2022 | Shahriar et al. | |
| 2022/0382527 A1 | 12/2022 | Wang et al. | |
| 2022/0414228 A1 | 12/2022 | Difonzo et al. | |
| 2023/0106226 A1 | 4/2023 | Bahrami et al. | |
| 2023/0146197 A1 | 5/2023 | Raman et al. | |
| 2023/0185915 A1* | 6/2023 | Rao | G06F 21/554 726/22 |
| 2023/0315722 A1 | 10/2023 | Saxe et al. | |
| 2023/0315856 A1 | 10/2023 | Lee et al. | |
| 2023/0316005 A1 | 10/2023 | Saxe | |
| 2023/0344843 A1* | 10/2023 | Zaytsev | H04L 63/145 |
| 2024/0037477 A1 | 2/2024 | Ladnai et al. | |
| 2024/0062133 A1 | 2/2024 | Saxe et al. | |
| 2024/0112115 A1 | 4/2024 | Ladnai et al. | |

FOREIGN PATENT DOCUMENTS

| | | |
|---|---|---|
| CN | 112395602 A | 2/2021 |
| EP | 3340570 A1 | 6/2018 |
| GB | 2587966 A | 4/2021 |
| JP | H0997150 A | 4/1997 |
| JP | 2009176132 A | 8/2009 |
| JP | 2017004233 A | 1/2017 |
| KR | 20090102001 A | 9/2009 |
| RU | 2659737 C1 | 7/2018 |
| WO | WO-2014152469 A1 | 9/2014 |
| WO | WO-2018086544 A1 | 5/2018 |
| WO | WO-2023187319 A1 | 10/2023 |

OTHER PUBLICATIONS

Office Action for Great Britain Application No. GB2303441 dated Aug. 31, 2023, 4 pages.

Padala, V., et al., "A noise filtering algorithm for event-based asynchronous change detection image sensors on truenorth and its implementation on truenorth", Frontiers in Neuroscience (2018); 12(118): 1-14.

Van De Erve, J., "Managing IIS Log File Storage" github (May 30, 2014) [online] https://github.com/MicrosoftDocs/iis-docs/blob/main/iis/manage/provisioning-and-managing-iis/managing-iis-log-file-storage.md (Access Date: Nov. 1, 2023); 5 pages.

[Author Unknown] "GPT-3". Wikipedia, Feb. 16, 2022, [Online] Retrieved from the Internet, https://web.archive.org/web/20220224001844/https:/en.wikipedia.org/wiki/GPT-3, 9 pages.

[Author Unknown] "Sigma". SigmaHQ, Feb. 22, 2022, [Online] Retrieved from the Internet, https://archive.org/details/github.com-SigmaHQ-sigma_-_2022-02-22_18-10- 22, 11 pages.

Lawton, George, "Exploring GPT-3 architecture", TechTarget, Jul. 15, 2021, [Online] Retrieved from the Internet, https://www.techtarget.com/searchenterpriseai/feature/Exploring-GPT-3-architecture, 5 pages.

International Search Report and Written Opinion for International Application No. PCT/GB2023/050650, dated May 22, 2023, 15 pages.

Agarwal, M., et al., "Neurips 2020 nlc2cmd competition: Translating natural language to bash commands", NeurIPS 2020 Competition and Demonstration Track, Proceedings of Machine Learning Research (2021); 133: 302-324.

Combined Search and Examination Report for Great Britain Patent Application No. GB2303438.2 dated Feb. 9, 2024, 2 pages.

Communication for Great Britain Patent Application No. GB2303441.6, by Sophos Limited; mailed Oct. 30, 2024, 7 pages.

"Counterclaim-Defendants' Preliminary Invalidity Contentions Against Counterclaim Plaintiff Sophos Ltd", United States District Court Western District of Texas Waco Division Nov. 23, 2022, 59 Pages.

Duan, Y., et al., "Detective: Automatically Identify and Analyze Malware Processes in Forensic Scenarios via DLLs", IEEE ICC 2015—Next Generation Networking Symposium (2015); pp. 5691-5969.

Eberle, W., et al., "Insider Threat Detection Using a Graph-Based Approach", Journal of Applied Security Research (2010); 6: 32-81 [online] https://eecs.wsu.edu/~holder/pubs/EberleJASR11.pdf; 90 Pages.

Examination Report for Great Britain Patent Application No. GB2303438.2 dated Sep. 15, 2023, 5 pages.

Examination Report for Great Britain Patent Application No. GB2303438.2 mailed Aug. 9, 2024, 4 pages.

Examination Report for Great Britain Patent Application No. GB2303441.6 dated Aug. 7, 2024, 6 pages.

Examination Report for Great Britain Patent Application No. GB2303441.6 dated Feb. 2, 2024, 4 pages.

"Exhibit B-01 Invalidity of U.S. Pat. No. 9,967,267 Under AIA Section 102 or 103 in view of U.S. Pat. No. 10,440,036 ("Pal")", United States District Court Western District of Texas Waco Division Nov. 23, 2022, 163 Pages.

"Exhibit B-02 Invalidity of U.S. Pat. No. 9,967,267 Under AIA Section 102 or 103 in view of U.S. Pat. No. 9,736,182 B1 ("Madhukar")", United States District Court Western District of Texas Waco Division Nov. 23, 2022, 146 Pages.

"Exhibit B-03 Invalidity of U.S. Pat. No. 9,967,267 Under AIA Section 102 or 103 in view of U.S. Patent Application Publication US 2015/0264062 ("Hagiwara")", United States District Court Western District of Texas Waco Division Nov. 23, 2022, 171 Pages.

(56) References Cited

OTHER PUBLICATIONS

"Exhibit B-04 Invalidity of U.S. Pat. No. 9,967,267 Under AIA Section 102 or 103 in view of U.S. Pat. No. 9,225,730 ("Brezinski")", United States District Court Western District of Texas Waco Division Nov. 23, 2022, 185 Pages.
"Exhibit B-05 Invalidity of U.S. Pat. No. 9,967,267 Under AIA Section 102 or 103 in view of U.S. Pat. No. 9,225,730 ("Li")", United States District Court Western District of Texas Waco Division Nov. 23, 2022, 161 Pages.
"Exhibit B-06 Invalidity of U.S. Pat. No. 9,967,267 Under AIA Section 102 or 103 in view of U.S. Pat. No. 10,397,261 ("Nomura")", United States District Court Western District of Texas Waco Division Nov. 23, 2022, 169 Pages.
"Exhibit B-07 Invalidity of U.S. Pat. No. 9,967,267 Under AIA Section 102 or 103 in view of U.S. Pat. No. 8,881,288 ("Nor")", United States District Court Western District of Texas Waco Division Nov. 23, 2022, 178 Pages.
"Exhibit B-08 Invalidity of U.S. Pat. No. 9,967,267 Under AIA Section 102 or 103 in view of Chinese Patent Application Publication No. CN 104504337 ("Tao")", United States District Court Western District of Texas Waco Division Nov. 23, 2022, 130 Pages.
"Exhibit B-09 Invalidity of U.S. Pat. No. 9,967,267 Under AIA Section 102 or 103 in view of U.S. Pat. No. 9,578,045 ("Jaroch")", United States District Court Western District of Texaswaco Division Nov. 23, 2022, 137 Pages.
"Exhibit B-10 Invalidity of U.S. Pat. No. 9,967,267 Under AIA Section 102 or 103 in view of U.S. Patent App. Publication No. 2011/0023120 ("Dai")", United States District Court Western District of Texaswaco Division Nov. 23, 2022, 144 pages.
"Exhibit B-103 Invalidity of U.S. Pat. No. 9,967,267 Obviousness Chart Under AIA 35 U.S.C. 103", United States District Court Western District of Texaswaco Division Nov. 23, 2022 , 115 Pages.
"Exhibit B-11 Invalidity of U.S. Pat. No. 9,967,267 Under AIA Section 102 or 103 in view of Prior Art Products", United States District Court Western District of Texas Waco Division Nov. 23, 2022 , 88 Pages.
Faruki, P., "Mining control flow graph as API call-grams to detect portable executable malware", Proceedings of the Fifth International Conference on Security of Information and Networks (Oct. 2012); pp. 130-137 [online] https://dl.acm.org/doi/10.1145/2388576.2388594; 8 Pages.
Final Office Action for U.S. Appl. No. 17/710,036 mailed Sep. 28, 2024, 7 pages.
Fu, Q., et al., "A transformer-based approach for translating natural language to bash commands", 2021 20th IEEE International Conference on Machine Learning and Applications (ICMLA), IEEE (2021); pp. 1245-1248.
Gardiner, J., "Command & Control: Understanding, Denying and Detecting", University of Birmingham (Feb. 2014); 38 pages.
Hu, X., et al., "Deep code comment generation", 2018 ACM/IEEE 26th International Conference on Program Comprehension (ICPC '18), Gothenburg, Sweden (May 27-28, 2018); pp. 200-210.
International Preliminary Report on Patentability for International Application No. PCT/GB2023/050650 mailed Oct. 10, 2024, 9 pages.
Jha, S., et al., "Two Formal Analyses of Attack Graphs", Proceedings 15th IEEE Computer Security Foundations Workshop. CSFW-15., IEEE (2002) [online] https://citeseerx.ist.psu.edu/document?repid=rep1&type=pdf&doi=9dc8a70b13dfeb7318de291c858c2d65f1ddbd5f; 15 pages.
King, S., et al., "Backtracking Intrusions", Department of Electrical Engineering and Computer Science, University of Michigan, Proceedings of the nineteenth ACM symposium on Operating systems principles (Oct. 2003); 14 pages.
Lin, X. V., et al., "Program Synthesis from Natural Language Using Recurrent Neural Networks", University of Washington Department of Computer Science and Engineering, Seattle, WA, USA, Tech. Rep. UW-CSE-17-03 1 (2017); 1-12.
Manadhata, P., "Detecting Malicious Domains via Graph Inference", Proceedings of the 2014 Workshop on Artificial Intelligent and Security Workshop, ESORICS 2014, Part 1, LNCS 8712 (2014); 18 pages.
Marak, V., "Machine Learning Part 3: Ranking", Infosec (Apr. 4, 2013) [online] https://resources.infosecinstitute.com/topics/machine-learning-and-ai/machine-learningpart-3-ranking (Access Date: Sep. 23, 2023); 6 pages.
Non-Final Office Action for U.S. Appl. No. 17/709,574 dated Apr. 25, 2024, 21 pages.
Non-Final Office Action for U.S. Appl. No. 17/710,036 dated May 24, 2024, 28 pages.
Non-Final Office Action for U.S. Appl. No. 17/710,127 dated Apr. 2, 2024, 8 pages.
Notice of Allowance for U.S. Appl. No. 17/710,127 mailed Jun. 27, 2024, 9 pages.
Ranade, P., et al., "CyBERT: Contextualized Embeddings for the Cybersecurity Domain", 2021 IEEE International Conference on Big Data (Big Data) (2021); 3334- 3342.
Raval, A., "Generation of Linux Commands Using Natural Language Descriptions", A Thesis Presented to The Academic Faculty, In Partial Fulfillment of the Requirements for the Degree Masters of Science in Computer Science, Georgia Institute of Technology (May 2018); 93 pages.
Rice, A., et al., "Command-and-control servers: The puppet masters that govern malware", TechTarget (Jun. 2014) [online] https://www.techtarget.com/searchsecurity/feature/Command-and-control-servers-The-puppet-masters-that-govern-malware (Access Date: Feb. 22, 2023); 7 Pages.
Shin, J., et al., "A survey of automatic code generation from natural language", Journal of Information Processing Systems (2021); 17(3): 537-555.
Song, X., et al., "A survey of automatic generation of source code comments: Algorithms and techniques", IEEE Access (2019); 7: 111411-111428.
Van De Erve, J., "Managing IIS Log File Storage" Microsoft Docs (May 3, 20140) [online] https://docs.microsoft.com/en-us/iis/manage/provisioning-and-managing-iis/managing-iis-log-file-storage (Access Date: Apr. 1, 20205); 9 pages.
Wang, P., et al., "An Advanced Hybrid Peer-to-Peer Botnet", School of Electrical Engineering and Computer Science, University of Central Florida, IEEE (Jul. 2008); 15 pages.
Yin, H., et al., "Panorama: capturing system-wide information flow for malware detection and analysis", Proceedings of the 14th ACM conference on Computer and Communications Security (Oct. 2007); 12 pages.
Zhu, N., et al., "Design, Implementation, and Evaluation of Repairable File Service", Proceedings of the 2003 International Conference on Dependable Systems and Networks (2003); 10 pages.
International Preliminary Report on Patentability for International Application No. PCT/GB2023/051290 mailed Nov. 28, 2024, 11 pages.
Notice of Allowance for U.S. Appl. No. 17/710,036 mailed Dec. 5, 2024, 10 pages.

* cited by examiner

```
[*] Information from most highly related case

Similar command 1
"C:\Windows\System32\wbem\WMIC.exe" /node:ASPENMEDICAL22 process call create "cmd.exe /c
start.exe"

Notes associated with MTR analysts' analysis of command:
"The MTR team was alerted to suspicious WMIC remote call activity when the user \"aspen_admin\"
(S-1-5-21-1176094420-5924139985-2448651443-1737) was seen initiating a WMIC remote process call
to the unprotected device \"ASPENMEDICAL22\" to launch cmd.exe. Further review of the users
activity showed then also initiating a PsExec connection to this unprotected machine as well as
creating the user account \"redadmin\" (S-1-5-21-1176094420-5924139985-2448651443-1701) which
has the description \"CentreRED\". Additional suspicious activity was seen for them
enumerating local admin accounts via the command \"C:\Windows\System32\net1 localgroup
administrators\". Reviewing logins by this account showed all logins were from the IPv6
address \"fe80::7c0f:e5d8:4e24:3816\" as well as the IPv4 address \"172.30.20.63\" prior to
this activity starting. Both devices are unprotected and therefore we cannot investigate these
for suspicious activity as well. At this time we recommend performing the below reference
for remediation steps.\n\nClient confirmed activity, resolving."
```

FIG. 5

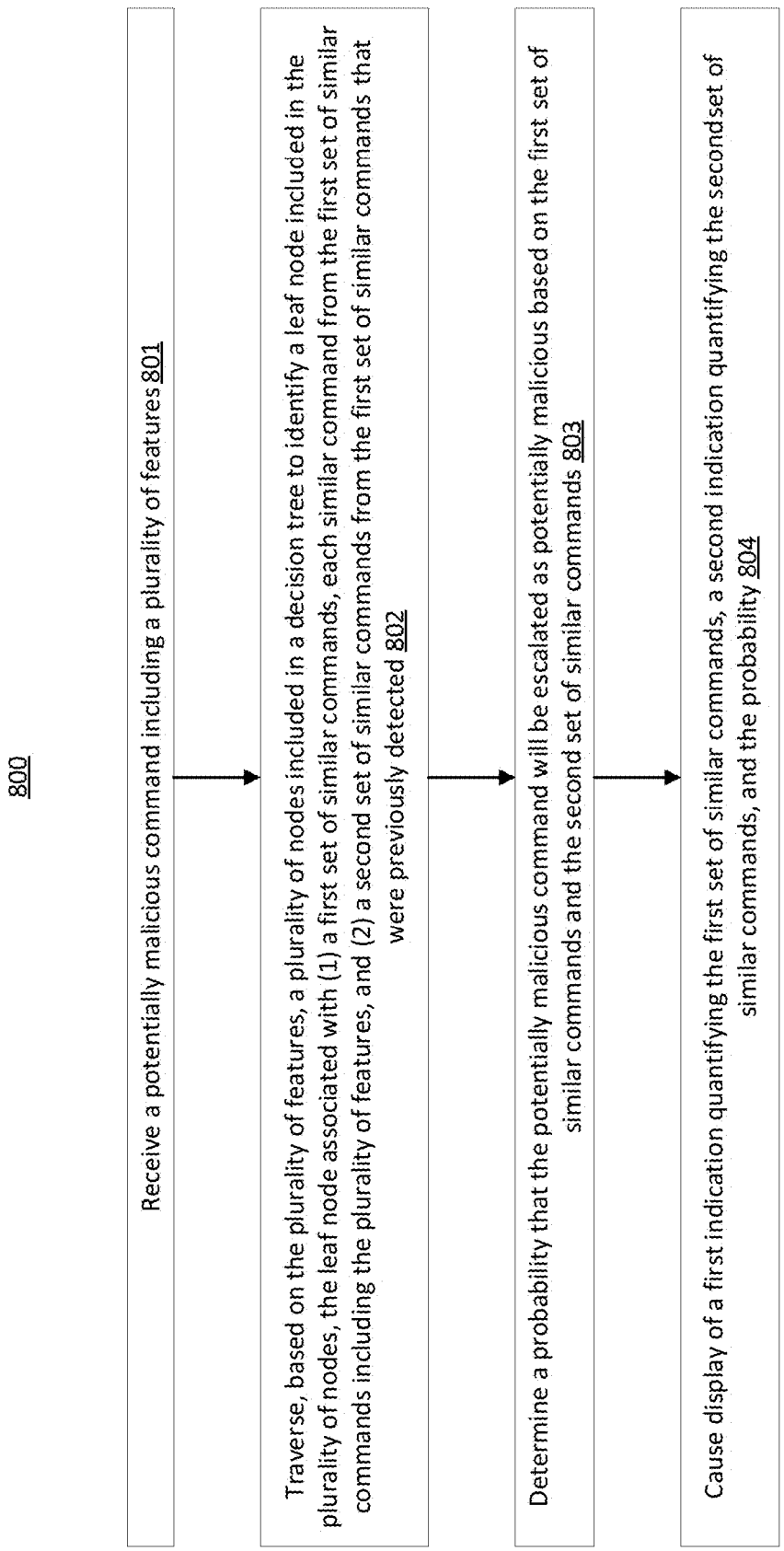

METHODS AND APPARATUS FOR MACHINE LEARNING TO GENERATE A DECISION TREE DATABASE TO IDENTIFY COMMANDS SIMILAR TO A COMMAND OF INTEREST

BACKGROUND

In one or more embodiments, a database of decision trees can be generated and used to identify a command(s) similar to a command of interest.

Commands, such as a command prompt input into a command line interface, can sometimes be desirable to understand. For example, in a cybersecurity context, a cybersecurity analyst may desire to understand a computing command that was performed by a user to evaluate a potential risk/maliciousness associated with that computing command and/or user. Many cybersecurity analysts, however, do not have the knowledge to understand the computing command under analysis at a desirable level. Because commands can be complex and/or hard to decipher, even analysts having prior experience with computing commands may not have a desirable level of understanding of that command. Thus, in many situations, cybersecurity analysts are not provided with enough information to make informed decisions regarding commands under investigation. As a result, the cybersecurity analyst may, for example, flag an event that may not need to have been flagged and/or not flag an event that should have been flagged.

In some instances, an analyst may look through previous commands that they have encountered to identify commands that could be similar to a command of interest; such technique, however, can be slow, inefficient, inaccurate, and reliant on an insufficient sample size. Accordingly, a need exists for an enhanced database (such as a decision tree database) to analyze and provide additional context regarding commands that is quicker, more efficient, more accurate, and more comprehensive compared to known systems and/or methods.

SUMMARY

A potentially malicious command including a first feature and a second feature is received. Additionally, a first node included in a decision tree and associated with the first feature is identified. The first node is associated with a first set of similar commands, each similar command from the first set of similar commands including the first feature. The first node is also associated with a second set of similar commands from the first set of similar commands that were previously detected. Additionally, a first probability that the potentially malicious command will be escalated as potentially malicious is determined based on the first set of similar commands and the second set of similar commands. Additionally, at least one of a representation of the first feature, a first indication quantifying the first set of similar commands, a second indication quantifying the second set of similar commands, or the first probability is caused to be displayed. Additionally, a second node included in the decision tree and associated with the second feature is identified. The second node is associated with a third set of similar commands, each similar command from the third set of similar commands including the first feature and the second feature. The second node is also associated with a fourth set of similar commands from the third set of similar commands that were previously detected. Additionally, a second probability that the potentially malicious command will be escalated as potentially malicious is determined based on the third set of similar commands and the fourth set of similar commands. Additionally, at least one of a representation of the second feature, a third indication quantifying the third set of similar commands, a fourth indication quantifying the fourth set of similar commands, or the second probability is caused to be displayed.

An indication of a potentially malicious behavior associated with a first feature and a second feature is received. Additionally, (1) a first set of similar behaviors, each similar behavior from the first set of similar behaviors including the first feature, and (2) a second set of similar behaviors from the first set of similar behaviors that were previously detected are determined based on the potentially malicious behavior and using one or more models. Additionally, a first probability that the potentially malicious behavior will be escalated as potentially malicious is determined based on the first set of similar behaviors and the second set of similar behaviors. Additionally, at least one of a representation of the first feature, a first indication quantifying the first set of similar behaviors, a second indication quantifying the second set of similar behaviors, or the first probability is caused to be displayed. Additionally, a third set of similar behaviors are determined using the one or more models, each similar behavior from the third set of similar behaviors including the first feature and the second feature. A fourth set of similar behaviors from the third set of similar behaviors that were previously detected are also determined using the one or more models. Additionally, a second probability that the potentially malicious behavior will be escalated as potentially malicious is determined based on the third set of similar behaviors and the fourth set of similar behaviors. Additionally, at least one of a representation of the second feature, a third indication quantifying the third set of similar behaviors, a fourth indication quantifying the fourth set of similar behaviors, or the second probability is caused to be displayed.

A potentially malicious command including a plurality of features is received. Additionally, a plurality of nodes included in a decision tree are traversed, based on the plurality of features, to identify a leaf node included in the plurality of nodes. The leaf node is associated with (1) a first set of similar commands, each similar command from the first set of similar commands including the plurality of features, and (2) a second set of similar commands from the first set of similar commands that were previously detected. Additionally, a probability that the potentially malicious command will be escalated as potentially malicious is determined based on the first set of similar commands and the second set of similar commands. Additionally, a first indication quantifying the first set of similar commands, a second indication quantifying the second set of similar commands, and the probability is caused to be displayed.

DRAWINGS

FIG. 5 shows case notes for a command that is similar to a potentially malicious command, according to an embodiment.

FIG. 8 shows a flowchart of a method for causing display of information associated with a command(s) similar to a potentially malicious command, according to an embodiment.

DETAILED DESCRIPTION

Figure 1:
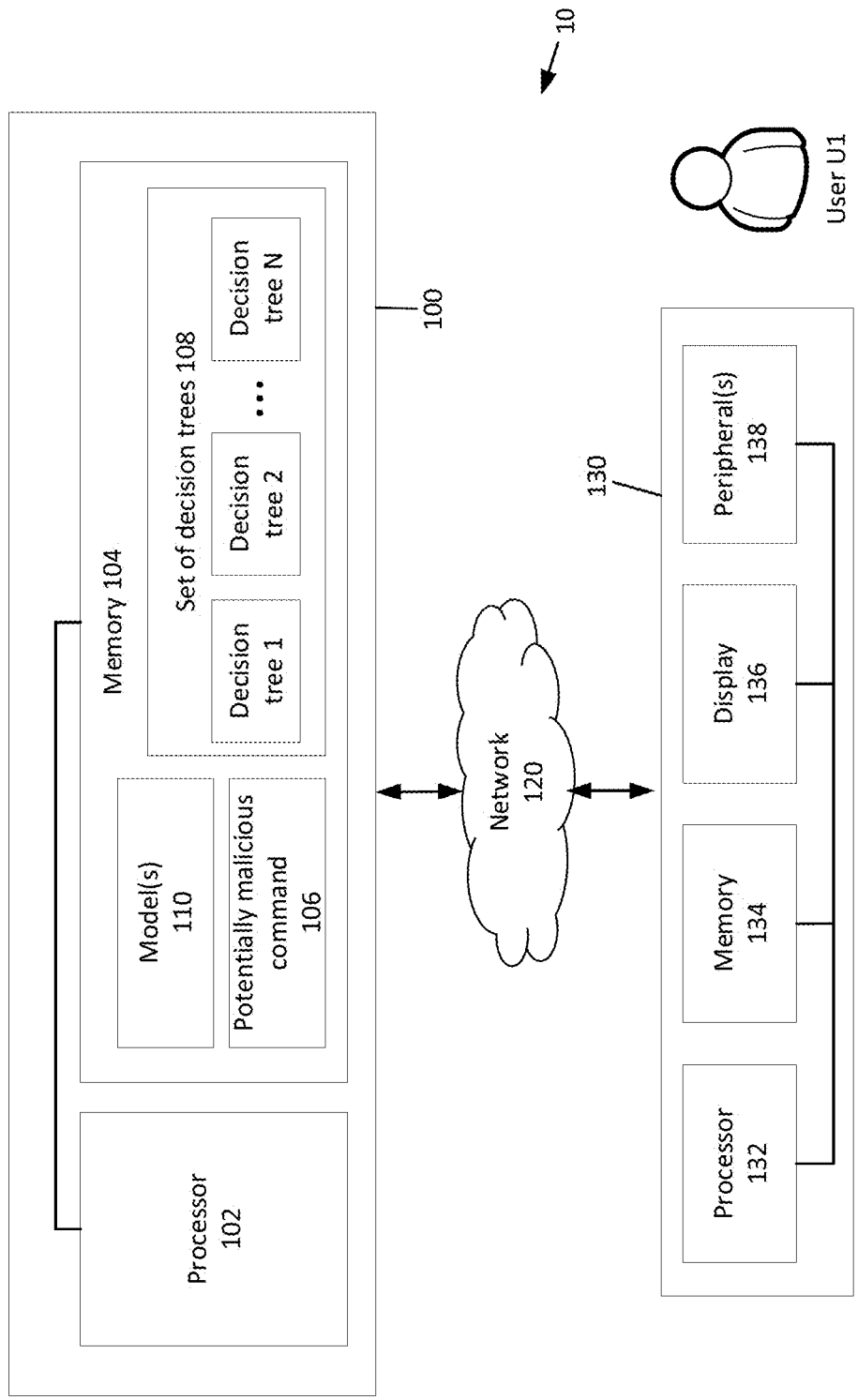
FIG. 1 shows a block diagram of a system that can be used to identify previous behaviors similar to a behavior under investigation, provide data about how likely the behavior under investigation is to result in a detection, and/or provide case notes for one or more of the identified behaviors similar to the behavior under investigation, according to an embodiment.

When a user, such as an analyst, is seeking additional information about a behavior of interest (e.g., command line, installing a software, running a program, deleting files, plugging in external devices, changing a database, modifying a network configuration, etc.), information on other behaviors similar to the behavior of interest can be determined and shown to the user. For example, the analyst may be shown information on how many similar behaviors already exist in a database (e.g., set of decision trees), how many similar behaviors were previously escalated/detected, the probability that the behavior of interest will result in escalation/detection, and/or the like. In some implementations, a behavior being "detected" or "escalated" can refer to determining that the behavior needs additional analysis (e.g., by a user, by a software model, etc.), determining that the behavior is potentially malicious, determining that the behavior is malicious, determining that the behavior has a specific functionality and/or feature that is to be detected, and/or the like. Such information can be provided to a user and can be useful in their decision-making process. For example, such information can allow a cybersecurity analyst flag an event as potentially malicious that otherwise may not have been flagged and/or not flag an event that otherwise would have been flagged.

Because the amount of behaviors similar to a behavior of interest can be large and/or complicated to understand, having the user manually identify each similar behavior can be costly, slow, inaccurate, and/or inefficient. Instead, the behaviors similar to a behavior of interest, as well as attributes associated with the behaviors similar to the behavior of interest, can be identified in substantially real time (e.g., at computing speed); this can allow the user to make decisions much faster, cheaper, and efficiently.

Furthermore, in some implementations, a set of metric values associated with the behaviors similar to a behavior of interest can be calculated and compared to a set of predetermined acceptable ranges. If, for example, a metric value is outside a predetermined acceptable range, a remedial action can be performed by a compute device automatically and without requiring analysis and/or input from a user. As such, the compute device can identify that a remedial action needs to be performed faster, cause a remedial action to be completed earlier, and/or be more accurate in determining if a remedial action needs to be performed compared to a scenario where the compute device did not calculate and utilize the set of metrics.

Moreover, in some implementations, users may have the ability to provide case notes for behaviors they have analyzed. Thereafter, case notes for the behavior can be shown to the same user and/or a different user in the future if the behavior is identified as a behavior similar to a future behavior of interest. Using case notes can allow knowledge transfer to occur for a user and/or amongst a group of users, thereby saving analysis time, providing insights that may not otherwise be realized, and/or the like.

FIG. 1 shows a block diagram of a system 10 that can be used to identify previous behaviors similar to (e.g., sharing one or more common features with) a behavior under investigation, provide data about how likely the behavior under investigation is to result in a detection, and/or provide case notes for one or more of the identified behaviors similar to the behavior under investigation, according to an embodiment. FIG. 1 includes a security operations compute device 100 operatively coupled to a user compute device 130 via a network 120.

The network 120 can be any suitable communications network for transferring data, operating over public and/or private networks. For example, the network 120 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the network 120 can be a wireless network such as, for example, a Wi-Fi or wireless local area network ("WLAN"), a wireless wide area network ("WWAN"), and/or a cellular network. In other instances, the network 120 can be a wired network such as, for example, an Ethernet network, a digital subscription line ("DSL") network, a broadband network, and/or a fiber-optic network. In some instances, the network can use Application Programming Interfaces (APIs) and/or data interchange formats, (e.g., Representational State Transfer (REST), JavaScript Object Notation (JSON), Extensible Markup Language (XML), Simple Object Access Protocol (SOAP), and/or Java Message Service (JMS). The communications sent via the network 120 can be encrypted or unencrypted. In some instances, the communication network 120 can include multiple networks or subnetworks operatively coupled to one another by, for example, network bridges, routers, switches, gateways and/or the like (not shown).

The user compute device 130 can be associated with (e.g., owned by, accessible by, operated by, etc.) a user U1, and can include a processor 132, a memory 134, a display 136, and peripheral(s) 138. The user compute device 130 can be, for example, a laptop computer, a desktop computer, a tablet, a smartphone, an internet-of-things device and/or the like. The user U1 can be any type of user, such as a student, a programmer, or a cybersecurity analyst. In some implementations, the user U1 is a user that desires further context about a behavior under investigation, such as a cybersecurity analyst seeking additional information about a potentially malicious command line to determine if that potentially malicious command line should be further investigated by another entity (e.g., escalated).

The processor 132 of the user compute device 130 can be, for example, a hardware based integrated circuit (IC) or any other suitable processing device configured to run and/or execute a set of instructions or code. For example, the processor 132 can be a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 132 can be operatively coupled to the memory 134 through a system bus (for example, address bus, data bus and/or control bus).

The memory 134 of the user compute device 130 can be, for example, a random-access memory (RAM), a memory buffer, a hard drive, a read-only memory (ROM), an erasable programmable read-only memory (EPROM), and/or the like. In some instances, the memory 134 can store, for example, one or more software programs and/or code that can include instructions to cause the processor 132 to perform one or more processes, functions, and/or the like. In some embodiments, the memory 134 can include extendable storage units that can be added and used incrementally. In some implementations, the memory 134 can be a portable memory (e.g., a flash drive, a portable hard disk, and/or the like) that can be operatively coupled to the processor 132. In some instances, the memory 134 can be remotely operatively coupled with a compute device (not shown). For example, a remote database device can serve as a memory and be operatively coupled to the compute device.

The peripheral(s) 138 can include any type of peripheral, such as an input device, an output device, a mouse, a keyboard, a microphone, a touch screen, a speaker, a scanner, a headset, a printer, a camera, and/or the like. In some instances, the user U1 can use the peripheral(s) 138 to indicate a behavior of interest (e.g., a potentially malicious command line) for which additional information (e.g., previous behaviors similar to the behavior under investigation, how likely the behavior under investigation is to result in a detection, case notes for the identified behaviors similar to the behavior under investigation, etc.) is desired. For example, the user U1 may type a potentially malicious command line into the user compute device 130 using a keyboard included in peripheral(s) 138 to indicate the behavior of interest for which additional information is desired and/or select the potentially malicious command line using a mouse included in peripheral s(s) 138 to indicate the behavior of interest for which additional information is desired.

Figure 3:
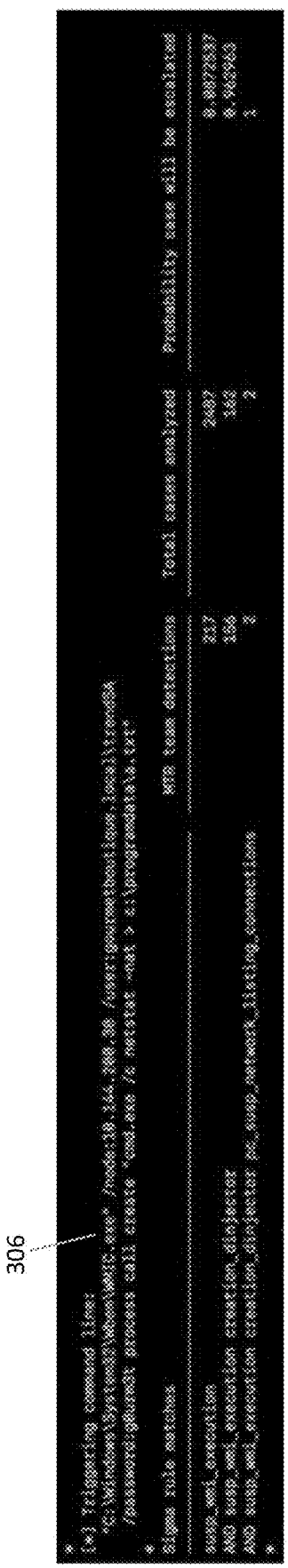
FIG. 3 shows an example of an output that can be displayed in response to receiving an indication/request to display information about similar behaviors associated with a potentially malicious command, according to an embodiment.
Figure 4:
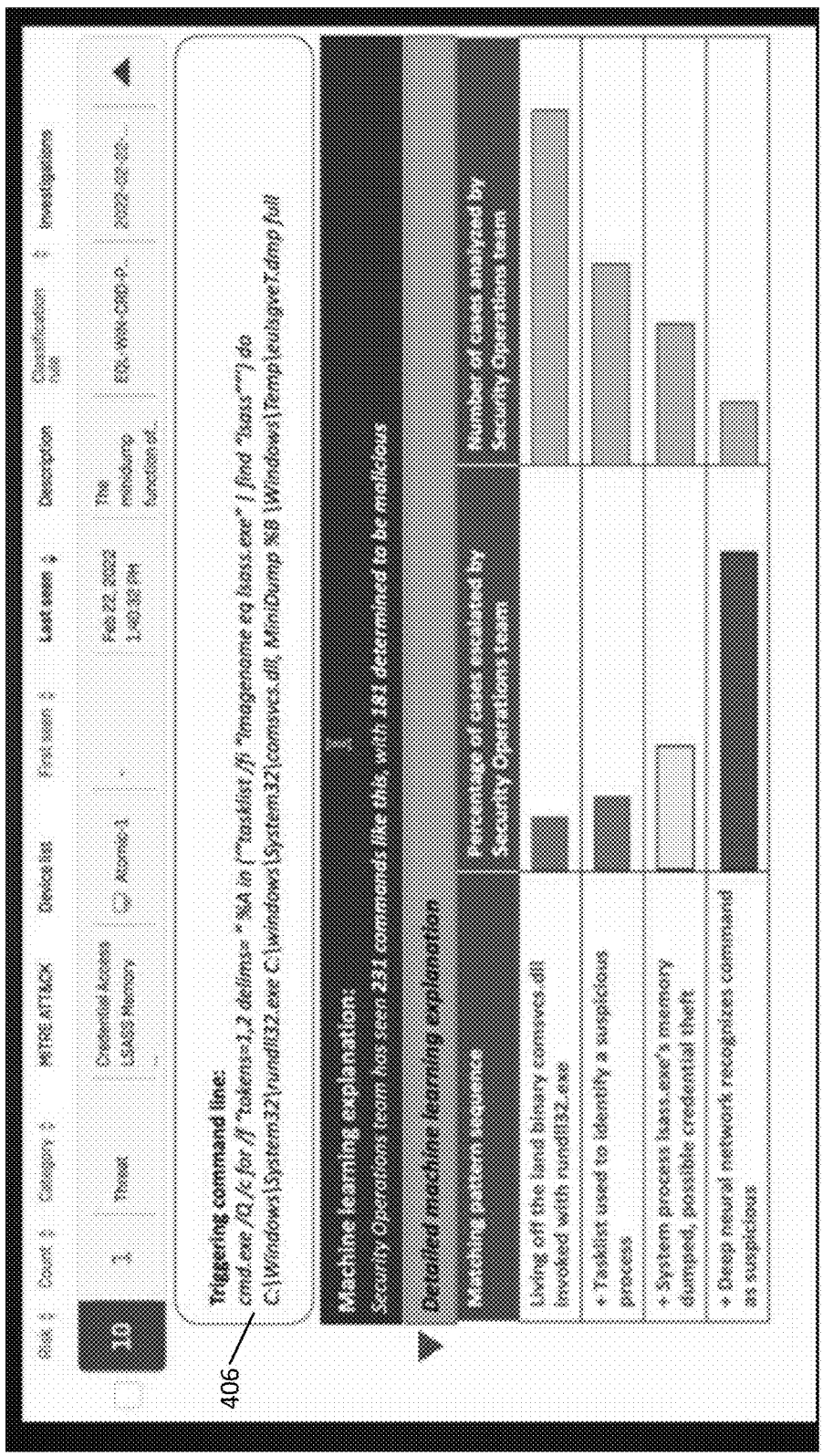
FIG. 4 shows an example of an output that can be displayed in response to receiving an indication/request to display information about similar behaviors associated with a potentially malicious command, according to an embodiment.

The display 136 can any type of display, such as a Cathode Ray tube (CRT) display, Liquid Crystal Display (LCD), Liquid Emitting Diode (LED) display, Organic Light Emitting Diode (OLED) display, and/or the like. The display 136 can be used for visually displaying information to user U1. For example, display 136 can display information about previous behaviors similar to the behavior under investigation (e.g., what the similar behaviors are, how similar the similar behaviors are to the behavior under investigation, how many similar behaviors exist, etc.), how likely the behavior under investigation is to result in a detection, case notes for the identified behaviors similar to the behavior under investigation, and/or the like. Examples of outputs that can be displayed by the display 136 are shown at FIGS. 3-5, described in further detail herein.

The security operations compute device 100 can include a processor 102 operatively coupled to a memory 104 (e.g., via a system bus). The security operations compute device 100 can be, for example, a server, a laptop computer, a desktop computer, a tablet, a smartphone, an internet-of-things device and/or the like.

The processor 102 of the security operations compute device 100 can be, for example, a hardware based integrated circuit (IC) or any other suitable processing device configured to run and/or execute a set of instructions or code. For example, the processor 102 can be a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 102 can be operatively coupled to the memory 104 through a system bus (e.g., address bus, data bus and/or control bus).

The memory 104 of the security operations compute device 100 can be, for example, a random-access memory (RAM), a memory buffer, a hard drive, a read-only memory (ROM), an erasable programmable read-only memory (EPROM), and/or the like. In some instances, the memory 104 can store, for example, one or more software programs and/or code that can include instructions to cause the processor 102 to perform one or more processes, functions, and/or the like. In some embodiments, the memory 104 can include extendable storage units that can be added and used incrementally. In some implementations, the memory 104 can be a portable memory (for example, a flash drive, a portable hard disk, and/or the like) that can be operatively coupled to the processor 102. In some instances, the memory 104 can be remotely operatively coupled with a compute device (not shown). For example, a remote database device can serve as a memory and be operatively coupled to the compute device.

The memory 104 of the security operations device 100 can include (e.g., store) a representation of a potentially malicious command 106. The potentially malicious command 106 can indicate, for example, a computing task to be performed (e.g., by user compute device 130 and/or a different compute device not shown in FIG. 1). The potentially malicious command 106 can be, for example, a command prompt command, a command line, MS-DOS command, control panel command, and/or the like. In some implementations, the potentially malicious command 106 is input by a user (e.g., user U1 and/or a different user not shown in FIG. 1) to a compute device (e.g., user compute device 130 and/or a different compute device not shown in FIG. 1) using a command-line interface (e.g., shell).

The potentially malicious command 106 can be associated with (e.g., include) a set of features (e.g., one feature, two features, three features, etc.). In some implementations, the set of features can include a prompt(s), a command(s), an option(s), an argument(s), an operator(s), a username(s), a hostname(s), a flag(s), any other command line element(s), or a combination thereof. In some implementations, each feature from the set of features can indicate a component/attribute associated with (e.g., that is caused to be performed by, that is included in, etc.) the potentially malicious command 106. In some implementations, the set of features associated with the potentially malicious command 106 can be determined based on deterministic rules (e.g., pattern matching, hand-written pattern matching code, and/or the like). In one example, if the potentially malicious command 106 is

```
C:\Windows\System32\Wbem\WMIC.exe" /node:10.144.200.30
/user:gourmetboutique.local/trendSA/password:g0ourm3t
process call create
    "cmd.exe /c netstate -nat > c:\programdata\a.txt",
``` the features of the potentially malicious command 106 can include, for example, features representing "susp_wmi_execution", "creation_dinjector", and "pc_susp_network_listing_connections". In some implementations, the features are determined using deterministic rules (e.g., pattern matching).

As another example, if the potentially malicious command 106 is

```
Cmd.exe /Q /c for /f "tokens=1,2 delims=
"%A in ("tasklist /fi "Imagename eq
lsass.exe" | find "lsass"") do
C:\Windows\System32\rundll32.exe
C:\windows\System32\comsvcs.dll, MiniDump
%B \windows\Temp\eulsgveT.dmp
full,
``` the features of the potentially malicious command 106 can include, for example, features representing "Living off the land binary comsvcs.dll invoked with rundll32.exe", "Tasklist used to identify a suspicious process", "System process lsass.exe's memory dumped, possible credential theft", and "Deep neural network recognizes command as suspicious". In some implementations, the features are determined using deterministic rules (e.g., pattern matching).

The memory 104 can also include (e.g., store) a database that is a representation of a set of decision trees 108. The set of decision trees 108 can include decision trees 1-N, where N can be any integer. Each decision tree from the set of decision trees 108 can be different than remaining decision trees from the set of decision trees 108. For example, the set of decision trees 108 can include a decision tree having a root node associated with a feature different than the root nodes of remaining decision trees from the set of decision trees 108, a decision tree having an amount of layers different than the amount of layers for at least one other decision tree from the set of decision trees 108, a decision tree having an amount of nodes different than the amount of nodes for at least one other decision tree from the set of decision trees 108, and/or a decision tree having branch decision rules different than branch decision rules for at least one other decision tree from the set of decision trees 108.

Furthermore, each decision tree from the set of decision trees 108 can include one or more nodes (e.g., root node(s), intermediate node(s), leaf node(s), etc.), where each node for that decision tree can (1) be associated with a set of features different than the set of features associated with remaining nodes for that decision tree, and (2) be associated with (e.g., include, store representations of, etc.) commands that include the set of features associated with that node. For example, a first node of decision tree 1 may be associated with commands that include a first feature, a second node of decision tree 1 may be associated with commands that include the first feature and a second feature, and a third node of decision tree 1 may be associated with commands that include the first feature, the second feature, and a third feature.

Furthermore, for each decision tree from the set of decision trees 108, the parent node of that decision tree can be associated with a set of commands including a first set of features, and a child node for the parent node of that decision tree can be associated with a set of commands including the first set of features and a second set of features different than the first set of features. For example, the root node of decision tree 1 may include a set of commands that include a first feature, and a child node of the root node of decision tree 1 may include a set of commands that include the first feature and a second feature different than the first feature. As such, in some implementations, for each decision tree from the set of decision trees 108, the quantity of commands associated a child node of that decision tree is not be greater than the quantity of commands associated with the immediate parent node of that child node. Furthermore, in some implementations, for each decision tree from the set of decision trees 108, the quantity of features associated with a child node of that decision tree will be greater than the quantity of features associated with the parent node of that child node. In some implementations, for each decision tree from the set of decision trees 108, the quantity of features associated with a child node of that decision tree will be greater than the quantity of features associated with the parent node of that child node by one. In some implementations, for each decision tree from the set of decision trees 108, the quantity of features associated with a child node of that decision tree will be greater than the quantity of features associated with the parent node of that child node by more than one.

Furthermore, in some implementations, for each decision tree from the set of decision trees 108, the root node of that decision tree can be associated with a feature different than the root nodes of remaining decision trees from the set of decision trees 108. For example, the root node of decision tree 1 may be associated with a set of commands that each include a first feature, the root node of decision tree 2 may be associated with a set of commands that each include a second feature different than the first feature, and the root node of decision tree N may be associated with a set of commands that each include a third feature different than the first feature and the second feature.

Moreover, each command for a set of commands associated with each node of each decision tree from the set of decision trees 108 can include an indication as to whether or not that command was previously detected for needing additional analysis, for being potentially malicious, for being malicious, for having a specific functionality and/or feature that is to be detected, etc. (and optionally, any other details related to that command being previously detected, such as a detection date and/or the compute device that detected that command at the detection date). Therefore, in addition to each node of each decision tree from the set of decision trees 108 being associated with a first set of commands that each include a set of features associated with that node, that node can be further associated with a second set of commands (e.g., that is a subset of the first set of commands, or that is the same as the first set of commands) that were previously detected/escalated. For example, for a node that is associated with a first feature and a second feature, the node can be associated with (1) a first set of commands that each include the first feature and the second feature, and (2) a second set of commands that (a) each include the first feature and the second feature, and (b) were previously detected.

Moreover, in some implementations, users (e.g., user U1 and/or other users not shown in FIG. 1) can provide notes (e.g., case notes) about commands that were previously analyzed, such as what the command was, what happened in response to analyzing the command, functionality associated with the command, outcomes of execution of the command, and/or the like. Such notes can become associated with (e.g., linked to) the command for which the notes were written. That way, a user (e.g., user U1 and/or a different user not shown in FIG. 1) viewing the command at a future time can refer to the notes that were previously provided for the command. Therefore, in some implementations, one or more commands for one or more nodes of one or more decision trees from the set of decision trees 108 can be associated with notes previously provided by a user (e.g., by user U1 and/or a different user not shown in FIG. 1). For example, for a node that is associated with a first feature and a second feature, the node can include (1) a first set of commands that each include the first feature and the second feature, and (2) a second set of commands that (a) each include the first feature and the second feature, and (b) are associated with case notes previously provided by a user.

In some implementations, the set of decision trees 108 can be trained, updated, and/or generated (e.g., by the security operations compute device 100, the user compute device 130, and/or a different compute device not shown in FIG. 1) using a set of multiple different commands (e.g., from SigmaHQ) that, when considered together, are associated with a set of multiple different features that indicate features associated with at least one command from the set of multiple different commands. As a simple example, if the set of multiple different commands includes a first command and second command, the first command includes a first feature and a second feature, and the second command includes a third feature, a fourth feature, and a fifth feature, the set of multiple different features can include the first feature, the second feature, the third feature, the fourth feature, and the fifth feature.

A machine learning model (e.g., model(s) 110, discussed additionally below) can be used to derive the set of decision trees 108 using the set of multiple different commands as inputs. In some implementations, each command from the set of multiple different commands is associated with multiple decision trees from the set of decision trees (e.g., the command has a first feature associated with a root node of a first decision tree and the command has a second feature associated with a root node of a second decision tree). In some implementations, the set of decision trees 108 are generated such that each command from the set of multiple different commands is associated with a leaf node of a decision tree from the set of decision trees 108. In some implementations, the set of decision trees 108 are generated such that each feature associated with at least one command from the set of multiple different commands is associated with a root node from the set of decision trees 108, each pair of features associated with at least one command from the set of multiple different commands is associated with a child node of a root node from the set of decision trees 108, each triplet of features associated with at least one command from the set of multiple different commands is associated with a child node of an intermediate node of a root node from the set of decision trees 108, and so on until each command from the set of multiple different commands is associated with a leaf node of a decision tree from the set of decision trees 108.

A machine learning model can analyze each command from the set of multiple different commands to determine if that command should be added to an existing tree from the set of decision trees 108 and/or if a new decision tree should be generated and included in the set of decision trees 108 that is associated that command at the root node. Furthermore, as additional commands not originally included in the set of multiple different commands are received (e.g., potentially malicious command 106), the machine learning model can analyze the additional commands to determine if the additional commands should be added to an existing tree from the set of decision trees 108 and/or if a new decision trees should be generated and included in the set of decision trees 108 that is associated with the additional commands at the root nodes.

In some implementations, the set of decision trees 108 can be trained, updated, and/or generated to use (e.g., be traversed using) a greedy approach (i.e., greedy algorithm) based on a set of multiple different commands and a set of multiple different features that indicate features included in at least one command from the set of multiple different commands. In some implementations, for each feature from the set of multiple different features, the set of decision trees 108 can be trained, updated, and/or generated by splitting commands from the multiple different commands that include that feature, constituting the root node of a decision tree from the set of decision trees 108, into one or more subsets associated with an additional feature(s) (where each subset from the one or more subsets is associated with a different feature(s) than the other subsets from the one or more subsets), which constitute the intermediate node(s) and/or leaf node(s). Such a process can be repeated on each remaining intermediate node in a recursive manner (e.g., recursive partitioning) until leaf nodes have been generated (i.e., an intermediate node was not generated) that reflect the features in the command. In some implementations, the splitting can be performed such that, after the set of decision trees 108 have been trained, updated, and/or generated, each command from the set of multiple different commands is associated with at least one leaf node of at least one decision tree from the set of decision trees 108. Furthermore, such a process as that described above can not only be performed using an initial set multiple different commands, but also can performed in the future using new commands to further update the set of decision trees 108 (e.g., such that the new commands are associated with at least one leaf node, whether the at least one leaf node already exists and/or needs to be generated). Thus, the set of decision trees 108 can become more comprehensive over time as additional potentially malicious commands are analyzed.

Furthermore, the set of decision trees 108 can be trained, updated, and/or generated such that each command from the set of multiple different commands includes an indication of (1) whether or not that command was previously detected and/or (2) notes provided by a user for that command. As a result, a node of a decision tree from the set of decision trees 108 associated with one or more features can be trained, updated, and/or generated such that the node is associated with a set of commands that each include the one or more features, an indication of the similar commands from the set of similar commands associated with the node that were previously detected, and/or notes for any similar commands from the set of commands associated with the node if previously provided by a user.

The memory 104 can also include a model(s) 110. The model(s) 110 can be, for example, an artificial intelligence (AI) model, machine learning (ML) model, analytical model, mathematical model, and/or the like. In some implementations, the model(s) 110 can include a model (e.g., natural language processing model) configured to identify features included in the potentially malicious command 106. In some implementations, the model(s) 110 can include a model configured to identify one or more sets of commands similar to the potentially malicious command 106 (e.g., share all features, share at least one feature, etc.) by traversing the set of decision tree 108 (e.g., using a greedy approach). In some implementations, the model(s) 110 can include a model configured to determine attributes (e.g., metric values) associated with the one or more sets of commands similar to the potentially malicious command 106 (e.g., total number of similar commands, proportion of similar commands that were previously detected, probability that the potentially malicious command 106 will be escalated, etc.). In some implementations, as previously discussed, the model(s) 110 can include a model (e.g., machine learning model) configured to generate and/or update the set of decision trees 108.

In an example scenario, the user U1 is attempting to learn more about a command of interest (e.g., that the user U1 believes could be malicious) by, for example, viewing information about a previous command(s) similar to the command(s) of interest, being provided data about how likely the command of interest is to result in a detection, and/or being provided case notes for the previous command(s) similar to the command of interest. As a result, the user U1 uses the user compute device 130 to indicate the command of interest for which additional information is requested, and an indication of that command of interest can be sent to the security operations compute device 100 and stored in memory 104 as potentially malicious command 106.

Thereafter, the security operations compute device 100 can use the model(s) 110 to identify the set of features included in the potentially malicious command 106. A first feature from the set of features can be selected using the model(s) 110, and a root node of a decision tree from the set of decision trees 108 that is associated with the first feature can be identified (assuming such a root node already exists). Note that additional details related to determining which feature to use as the first feature are discussed in further detail herein. Any other commands associated with the root node can be referred to as a first set of similar commands, since the commands in the first set of similar commands and the potentially malicious command 106 include the first feature. Furthermore, as indicated herein, the root node can also be associated with indications of similar commands from the first set of similar commands that were previously detected and/or can be associated with cases notes for any similar commands from the first set of similar commands if they were previously provided. Furthermore, the potentially malicious command 106 can become associated with the root node, as well as cases notes if later provided (e.g., by user U1) and/or an indication that the potentially malicious command 106 was eventually detected.

In a scenario where a root node of a decision tree from the set of decision trees 108 associated with the first feature does not yet exist, as discussed elsewhere herein, a decision tree can be generated that includes a root node associated with the first feature; in such a scenario, any other commands previously analyzed when generating the set of decision trees 108 that also include the first feature (if they exist) can become associated with the root node of the newly generated decision tree, as well as indications of those commands that were previously detected and/or are associated with case notes, if provided.

Thereafter, if the set of features included in the potentially malicious command 106 includes multiple features, a second feature from the set of features can be selected using model(s) 110, and a child node of the root node that is associated with the first feature and the second feature can be identified (assuming such a child node already exists). Any other commands associated with the child node can be referred to as a second set of similar commands. The commands in the second set of similar commands and the potentially malicious command 106 include the first feature and the second feature. Furthermore, as indicated herein, the child node can also be associated with indications of similar commands from the second set of similar commands that were previously detected and/or be associated with cases notes for any similar commands from the second set of similar commands if they were previously provided. Furthermore, the potentially malicious command 106 can become associated with the child node of the root node, as well as case notes if later provided (e.g., by user U1) and/or an indication that the potentially malicious command 106 was eventually detected.

In a scenario where a child node of the root node of a decision tree from the set of decision trees 108 associated with the first feature and the second feature does not yet exist, as discussed elsewhere herein, the child node of the root node can be generated that is associated with the first feature and the second feature; in such a scenario, any other commands previously analyzed when generating the set of decision trees 108 that also include the first feature and the second feature (if they exist) can become associated with the newly generated child node of the root node, as well as indications of those commands that were previously detected and/or are associated with case notes, if provided.

Such a process as that described for identifying and/or generating the child node can be repeated for each feature from the set of features until a leaf node is identified and/or generated. The leaf node can also be associated with indications of similar commands that include features from the set of features and/or can be associated with case notes for any similar commands that include features from the set of features if they were previously provided.

After the set of features associated with the potentially malicious command 106 have been used to identify and/or generate a leaf node for a decision tree from the set of decision trees 108, information associated with the set of similar commands associated with the leaf node can be analyzed and/or caused to be sent to the user compute device 130 for display at display 136. In some implementations, an indication quantifying the set of similar commands associated with the leaf node can be caused to be displayed at display 136. In some implementations, an indication representing the proportion of similar commands from the set of similar commands associated with the leaf node that were previously detected can be caused to be displayed at display 136 (e.g., by dividing a count of similar commands associated with the leaf node that were previously detected over a count of similar commands associated with the leaf node). In some implementations, case notes for those similar commands from the set of similar commands can be caused to be displayed at the display 136. In some implementations, an indication that case notes for those similar commands from the set of similar commands exist can be caused to be displayed at display 136, and in response to receiving a request from the user compute device 130 to display one or more of the cases notes for one or more similar commands from the set of similar commands, the one or more cases notes for the one or more similar commands can be caused to be displayed at display 136. Note that information associated with the set of similar commands associated with any node (i.e., not just a leaf node; e.g., a root node or an intermediate node) can also be caused to be sent to the user compute device 130 for display at display 136, in some implementations.

Furthermore, after the set of features associated with the potentially malicious command 106 have been used to identify and/or generate a leaf node for a decision tree from the set of decision trees 108, information associated with the set of similar commands associated with the leaf node can be analyzed to determine if a remedial action should occur. In some implementations, if an indication quantifying the set of similar commands associated with the leaf node is outside a predetermined acceptable range, a remedial action can be performed. In some implementations, if an indication representing the proportion of similar commands from the set of similar commands associated with the leaf node that were previously detected is outside a predetermined acceptable range, a remedial action can be performed. Examples of remedial actions can include automatically escalating the potentially malicious command 106 without requiring input from user U1, causing a compute device that performed and/or executed the potentially malicious command 106 to shut down, causing a compute device that performed and/or executed the potentially malicious command 106 to take actions to increase security, and/or the like. Note that information associated with the set of similar commands associated with any node (i.e., not just a leaf note; e.g., a root node or an intermediate node) can be analyzed to determine if a remedial action should occur, in some implementations.

Furthermore, the potentially malicious command 106 can be used to update the set of decision trees 108. For example, the potentially malicious command 106 can become associated with one or more nodes, where the one or more nodes are associated with one or more features included in the potentially malicious command 106. As such, the one or more nodes become associated with an additional command. Furthermore, if the user U1 escalated the potentially malicious command 106, an indication that the potentially malicious command 106 was escalated can be stored as associated with the set of decision trees 108 for the potentially malicious command 106 during updating. Furthermore, if the user U1 provided case notes for the potentially malicious command 106 (e.g., using peripheral(s) 138), a representation of the case notes can be stored as associated with the set of decision trees 108 for the potentially malicious command 106 during updating.

In some implementations, any technique can be used to determine the order of features included in the potentially malicious command 106 that are used to identify a root node and/or child node from a parent node. In some implementations, for a set of features included in the potentially malicious command 106, the feature that would lead to a node that is associated with the least number of similar commands can be selected. In some implementations, for a set of features included in the potentially malicious command 106, the feature that would lead to a node that is associated with the largest number of similar commands can be selected. In some implementations, for a set of features included in the potentially malicious command 106, the feature that would lead to a node that is associated with a number of similar commands closest to a predetermined value can be selected.

In some implementations, a greedy algorithm can be used to determine the order of features included in the potentially malicious command 106 that are used to identify a root node and/or child node from a parent node. For example, in some implementations, for a set of features included in the potentially malicious command 106, the feature that would lead to a node that is most determinative is selected (e.g., the node/feature that would get closest to identifying the potentially malicious command 106 as malicious). In some implementations, a node is more determinative as the proportion of commands from a set of commands associated with a node that were previously detected/escalated is higher. In some implementations, a node is more determinative as the number of commands from a set of commands associated with a node that were previously detected/escalated is higher.

Furthermore, although the set of decision trees 108 shown in FIG. 1 include at least three decision trees, in some implementations, the set of decision trees 108 can include any number of decision tress more or less than three. Furthermore, although a set of decision trees 108 is used in FIG. 1 to identify a set of similar commands associated with the potentially malicious command 106, in some implementations, any other suitable data structure(s) can be used, such as a table or graph. Furthermore, although similar commands for a potentially malicious command 106 are identified in FIG. 1, in some implementations, similar behaviors for any potentially malicious behavior or lack thereof can be identified, such as, for example, user activity, user input, network communications, malicious software, and/or the like.

Furthermore, although FIG. 1 shows a single potentially malicious command 106, the security operations compute device 100 can be used with multiple potentially malicious commands. For example, a second potentially malicious command different than potentially malicious command 106 can be analyzed to identify previous commands similar to the second potentially malicious command, provide data about how likely the second potentially malicious command is to result in a detection, and/or provide case notes for one or more of the commands similar to the second potentially malicious command. Thus, the set of decision trees 108 can be repeatedly updated (e.g., each time a new potentially malicious command is analyzed).

Furthermore, although FIG. 1 shows the security operations compute device 100 operatively coupled to a single compute device (i.e., user compute device 130), in some implementations, the security operations compute device 100 can be operatively coupled to a plurality of compute devices. In such a scenario, the security operations compute device 100 may receive a plurality of multiple different potentially malicious commands. As the security operations compute device 100 continues to receive multiple different potentially malicious commands, the set of decision trees 108 can be updated to account for the multiple different potentially commands as they are received (e.g., update a node, create a new code, create a new decision tree, etc.). Thus, the security operations compute device 100 being separate (e.g., remote) from the user compute device 130 can allow the set of decision trees 108 to be more accessible and/or extensive (e.g., include information associated with more commands) compared to a scenario where operations of the security operations compute device 100 are performed locally at the user compute device 130. Note, however, that in some implementations the security operations compute device 100 is not separate from the user compute device 130; if, for example, transferring data across devices is a concern (e.g., security or privacy concern), storing and executing the model(s) 110, potentially malicious command 106, and/or set of decision trees 108 at memory 134 and processor 132, respectively, of the user compute device 130 may be desirable.

Figure 2:
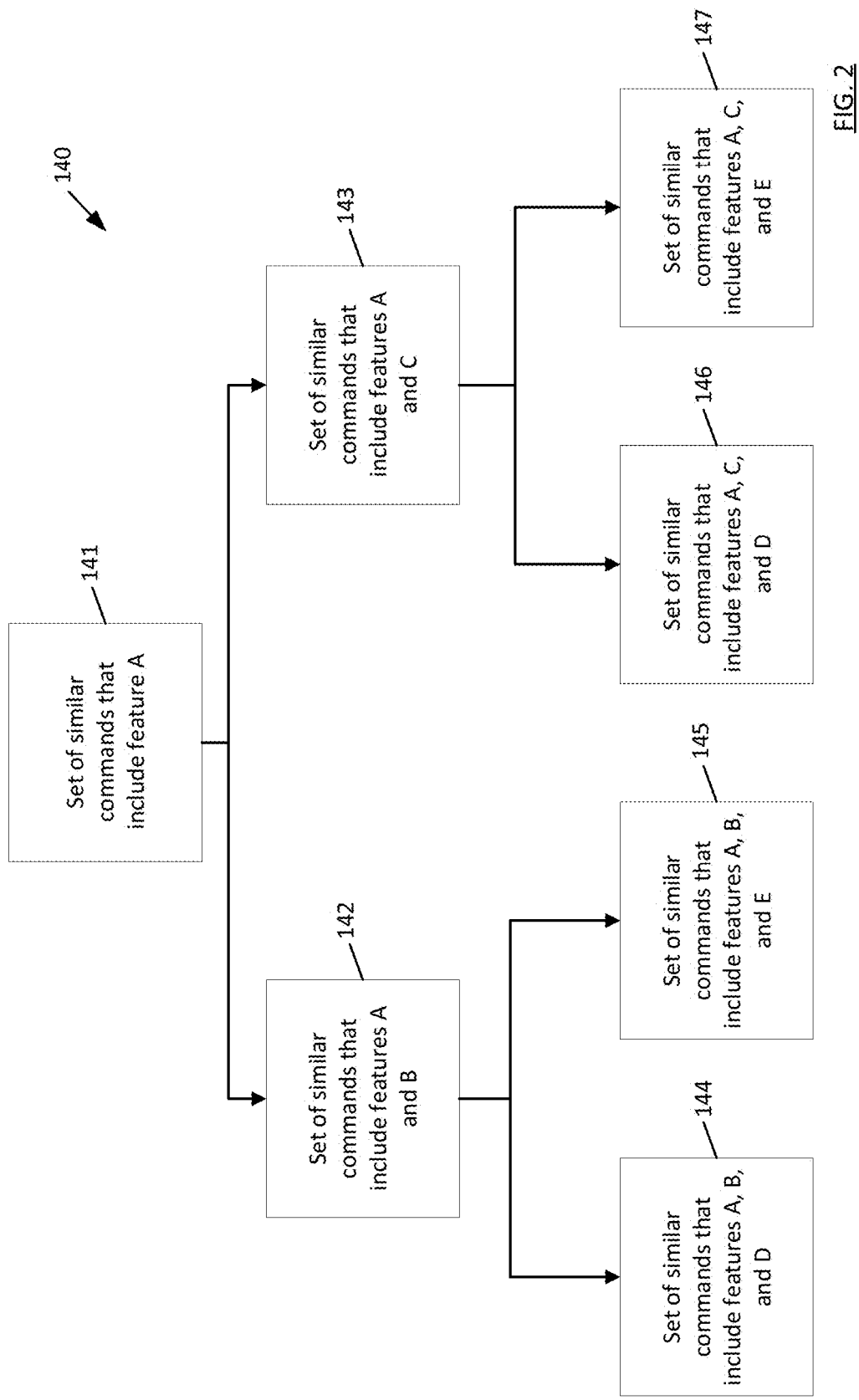
FIG. 2 shows an example of a decision tree, according to an embodiment.

FIG. 2 shows an example of a decision tree 140, according to an embodiment. The decision tree 140 can be, for example, one of decision tree 1, decision tree 2, or decision tree N from the set of decision trees 108 shown in FIG. 1.

The root node 141 is associated with a set of commands that includes feature A (i.e., a first feature). Said similarly, when the decision tree 140 is trained and/or generated using a set of command lines, each command line from the set of command lines that includes feature A becomes associated with (e.g., linked to, included in, etc.) the root node 141. The root node 141 can also store indications of the commands associated with root node 141 that were previously detected, an indication of how many of the commands associated with root node 141 were previously detected, and/or case notes for a command(s) associated with root node 141 if previously provided.

Intermediate node 142 is a child node of the root node 141, and is associated with a set of commands that includes both features A and B (i.e., a first feature and a second feature). Said similarly, when the decision tree 140 is trained and/or generated using a set of command lines, each command line from the set of command lines that includes features A and B becomes associated with (e.g., linked to, included in, etc.) the intermediate node 142. Thus, a command associated with root node 141 that does not include feature B would not be associated with intermediate node 142, while each of the set of commands associated with intermediate node 142 would be included in the set of commands associated with root node 141. The intermediate node 142 can also store indications of the commands associated with intermediate node 142 that were previously detected, an indication of how many of the commands associated with intermediate node 142 were previously detected, and/or case notes for a command(s) associated with intermediate node 142 if previously provided.

Intermediate node 143 is a child node of the root node 141, and is associated with a set of commands that includes both features A and C (i.e., a first feature and a third feature). Said similarly, when the decision tree 140 is trained and/or generated using a set of command lines, each command line from the set of command lines that included features A and C becomes associated with (e.g., linked to, included in, etc.) the intermediate node 143. Thus, a command associated with root node 141 that does not include feature C would not be associated with intermediate node 143, while each of the set of commands associated with intermediate node 143 would be included in the set of commands included at root node 141. The intermediate node 143 can also store indications of the commands associated with intermediate node 143 that were previously detected, an indication of how many of the commands associated with intermediate node 143 were previously detected, and/or case notes for a command(s) associated with intermediate node 143 if previously provided.

Leaf node 144 is a child node of intermediate node 142, and is associated with a set of commands that includes features A, B, and D. Said similarly, when the decision tree 140 is trained and/or generated using a set of command lines, each command line from the set of command lines that includes features A, B, and D becomes associated with (e.g., linked to, included in, etc.) the leaf node 144. The leaf node 144 can also store indications of the commands associated with leaf node 144 that were previously detected, an indication of how many of the commands associated with leaf node 144 were previously detected, and/or case notes for a command(s) associated with leaf node 144, if any, that were previously provided.

Leaf node 145 is a child node of intermediate node 142, and is associated with a set of commands that includes features A, B, and E. Said similarly, when the decision tree 140 is trained and/or generated using a set of command lines, each command line from the set of command lines that includes features A, B, and E becomes associated with (e.g., linked to, included in, etc.) the leaf node 145. The leaf node 145 can also store indications of the commands associated with leaf node 145 that were previously detected, an indication of how many of the commands associated with leaf node 145 were previously detected, and/or case notes for a command(s) associated with leaf node 145, if any, that were previously provided.

Leaf node 146 is a child node of intermediate node 143, and is associated with a set of commands that includes features A, C, and D. Said similarly, when the decision tree 140 is trained and/or generated using a set of command lines, each command line from the set of command lines that includes features A, C, and D becomes associated with (e.g., linked to, included in, etc.) the leaf node 146. The leaf node 146 can also store indications of the commands associated with leaf node 146 that were previously detected, an indication of how many of the commands associated with leaf node 146 were previously detected, and/or case notes for a command(s) associated with leaf node 146, if any, that were previously provided.

Leaf node 147 is a child node of intermediate node 143, and is associated with a set of commands that includes features A, C, and E. Said similarly, when the decision tree 140 is trained and/or generated using a set of command lines, each command line from the set of command lines that includes features A, C, and E becomes associated with (e.g., linked to, included in, etc.) the leaf node 147. The leaf node 147 can also store indications of the commands associated with leaf node 147 that were previously detected, an indication of how many of the commands associated with leaf node 147 were previously detected, and/or case notes for a command(s) associated with leaf node 147, if any, that were previously provided.

If, for example, the potentially malicious command 106 from FIG. 1 includes only features A, B, and D, the set of commands associated with leaf node 144 would be determined as a set of similar commands for the potentially malicious command 106 (e.g., by model(s) 110). As such, the set of commands associated with the leaf node 144 can be analyzed for information that would be useful to display to a user (e.g., user U1). In some implementations, the set of commands associated with the root node 141 and/or intermediate node 142 can also be considered as a set(s) of similar commands and/or be analyzed for information that would be useful to display to a user.

FIG. 3 shows an example of an output that can be displayed on a display (e.g., display 136 of FIG. 1) in response to receiving a request to display information about similar behaviors associated with a triggering command line 306 (e.g., potentially malicious command 106), according to an embodiment. As shown in FIG. 3, the triggering command line 306 is

```
C:\Windows\System32\Wbem\WMIC.exe" /node:10.144.200.30
/user:gourmetboutique.local/trendSA/password:g0ourm3t
process call create
  "cmd.exe /c netstate -nat > c:\programdata\a.txt",
``` and includes "susp_wmi_execution", "creation_dinjector", and "pc_susp_network_listing_connections" as features.

A decision tree from the set of decision trees 108 can be traversed to (1) find a root node associated with "susp_wmi_execution", (2) find an intermediate node that is a child of the root node associated with "susp_wmi_execution" and "creation_dinjector", and (3) find a leaf node that is a child node of the intermediate node associated with "susp_wmi_execution", "creation_dinjector", and "pc_susp_network_listing_connections". Furthermore, one or more signals can be sent to user compute device 130 indicating information associated with one or more of the nodes that were traversed, and the user compute device 130 can display such information on the display 136 to user U1 in response to receiving the one or more signals.

For example, FIG. 3 includes a first row that displays information generated based on the root node associated with "susp_wmi_execution", including information that (1) the root node is associated with 2487 other commands that also include "susp_wmi_execution" as a feature, (2) 217 commands from the 2487 commands also including "susp_wmi_exeuction" as a feature were previously detected (e.g., previously determined to be potentially malicious, previously determined to be malicious, etc.), and (3) the probability that a potentially malicious command line including "susp_wmi_exeuction" as a feature will be escalated is 0.0872537 (i.e., 217/2487). Furthermore, FIG. 3 include a second row that displays information generated based on the intermediate node associated with "susp_wmi_execution" and "creation_dinjector", including information that (1) the intermediate node is associated with 162 other commands that also include "susp_wmi_execution" and "creation_dinjector" as a feature, (2) 156 commands from the 162 also including "susp_wmi_execution" and "creation_dinjector" as a feature were previously detected, and (3) the probability that a potentially malicious command line including "susp_wmi_exeuction" and "creation_dinjector" will be escalated is 0.962963 (i.e., 156/162). Furthermore, FIG. 3 includes a third row that displays information generated based on the leaf node associated with "susp_wmi_execution", "creation_dinjector" and "pc_susp_network_listing_connections", including information that (1) the leaf node is associated with two other commands that also include "susp_wmi_execution", "creation_dinjector", and "pc_susp_network_listing_connections" as a feature, (2) both commands from the two commands also including "susp_wmi_execution", "creation_dinjector", and "pc_susp_network_listing_connections" as a feature were previously detected, and (3) the probability that a potentially malicious command line including "susp_wmi_exeuction", "creation_dinjector", and "pc_susp_network_listing_connections" (i.e., the triggering command line 306) will be escalated is 1 (i.e., 2/2).

FIG. 4 shows another example of an output that can be displayed on a display (e.g., display 136 of FIG. 1) in response to receiving an indication/request to display information about similar behaviors associated with a triggering command line 406 (e.g., potentially malicious command 106), according to an embodiment. As shown in FIG. 4, the triggering command line 406 is:

```
Cmd.exe /Q /c for /f "tokens=1,2 delims=
"%A in (""tasklist /fi "Imagename eq
lsass.exe" | find "lsass""") do
C:\Windows\System32\rundll32.exe
C:\windows\System32\comsvcs.dll, MiniDump
%B \windows\Temp\eulsgveT.dmp
full
``` and includes "Living off the land binary comsvcs.dll invoked with rundll32.exe", "Tasklist used to identify a suspicious process", "System process lsass.exe's memory dumped, possible credential theft", and "Deep neural network recognizes command as suspicious" as features.

A decision tree from the set of decision trees 108 can be traversed to (1) find a root node associated with "Living off the land binary comsvcs.dll invoked with rundll32.exe", (2) find a first intermediate node that is a child of the root node associated with "Living off the land binary comsvcs.dll invoked with rundll32.exe" and "Tasklist used to identify a suspicious process", (3) find a second intermediate node that is a child node of the first intermediate node associated with "Living off the land binary comsvcs.dll invoked with rundll32.exe", "Tasklist used to identify a suspicious process", and "System process lsass.exe's memory dumped, possible credential theft", and (4) find a leaf node that is a child of the second intermediate node associated with "Living off the land binary comsvcs.dll invoked with rundll32.exe", "Tasklist used to identify a suspicious process", "System process lsass.exe's memory dumped, possible credential theft", and "Deep neural network recognizes command as suspicious".

Furthermore, one or more signals can be sent to user compute device 130 indicating information associated with the root node, first intermediate node, second intermediate node, and/or leaf node, and the user compute device 130 can display the information on the display 136 to user U1 in response to receiving the one or more signals. For example, as can be seen at FIG. 4, 231 commands are similar to the triggering command line 406 (e.g., because the leaf node associated with "Living off the land binary comsvcs.dll invoked with rundll32.exe", "Tasklist used to identify a suspicious process", "System process lsass.exe's memory dumped, possible credential theft", and "Deep neural network recognizes command as suspicious" is associated with 231 commands), and 181 of the 231 commands similar to the triggering command line 406 were determined to be malicious (e.g., were detected). Furthermore, also as shown at FIG. 4, indications of the number of commands associated with each node that was traversed, as well as the percentage of commands associated with that node that were detected and/or escalated, can be displayed.

FIG. 5 shows case notes for a command that is similar to (e.g., shares at least one feature with, shares all the same features as, etc.) a potentially malicious command (e.g., potentially malicious command 106 of FIG. 1), according to an embodiment. After a user (e.g., user U1 and/or a different user not shown in FIG. 1) has analyzed a command, the user can provide notes for the command; those notes can be saved and shown to a user (e.g., user U1 and/or a different user not shown in FIG. 1) in the future. For example, after a first user has analyzed a command for being potentially malicious, the first user may provide notes regarding their analysis. Thereafter, if the command for which the first user provided notes shares one or more features with a future command that is being analyzed by a second user for being potentially malicious, the notes provided by the first user can be shown to the second user. That way, the second user can be provided additional information related to cases that are similar to the command that they are currently analyzing, which can serve to further inform decisions made by the second user.

Figure 6:
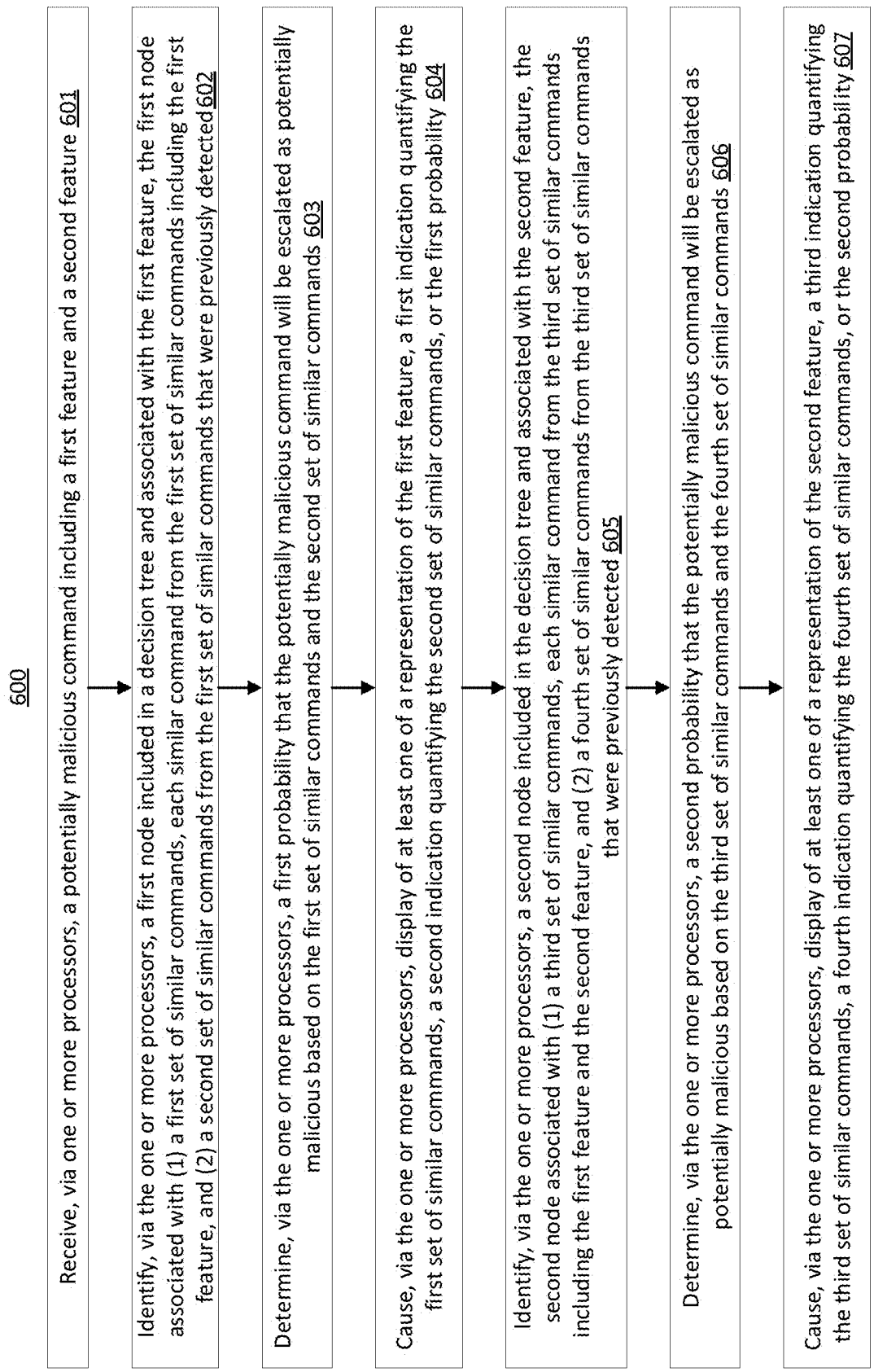
FIG. 6 shows a flowchart of a method for causing display of information associated with a command(s) similar to a potentially malicious command, according to an embodiment.

FIG. 6 shows a flowchart of a method 600 for causing display of information associated with a command(s) similar to a potentially malicious command, according to an embodiment. In some implementations, method 600 can be performed by one or more processors (e.g., processor 102 of FIG. 1).

At 601, a potentially malicious command (e.g., potentially malicious command 106) including a first feature and a second feature is received. The first feature can be different than the second feature. The potentially malicious command can be received by, for example, the processor 102 of the security operations compute device 100 from the user compute device 130. In some implementations, the potentially malicious command is a potentially malicious command line.

At 602, a first node included in a decision tree (e.g., a decision tree from the set of decision trees 108 (of FIG. 1) and/or decision tree 140 (of FIG. 2)) and associated with the first feature is identified (e.g., using model(s) 110). The first node is associated with a first set of similar commands, each similar command from the first set of similar commands including the first feature. Thus, the set of commands associated with the first node are similar to the potentially malicious command in the sense that both the set of commands associated with the first node and the potentially malicious command include the first feature. The first node is also associated with a second set of similar commands from the first set of similar commands that were previously detected. The second set of similar commands can be a subset of the first set of similar commands. The first node can be a parent node, such as a root node or an intermediate node. In some implementations, 602 is performed automatically (e.g., without requiring human input) in response to completing 601.

At 603, a first probability that the potentially malicious command will be escalated (e.g., detected) as potentially malicious is determined based on the first set of similar commands and the second set of similar commands. In some implementations, the first probability is determined using a function that includes dividing a number of commands in the second set of similar commands by a number of commands in the first set of similar commands (or vice versa). In some implementations, 603 is performed automatically (e.g., without requiring human input) in response to completing 602.

At 604, at least one of a representation of the first feature, a first indication quantifying the first set of similar commands, a second indication quantifying the second set of similar commands, or the first probability is caused to be displayed. Causing display can include, for example, sending a signal of the representation of the first feature, the first indication quantifying the first set of similar commands, the second indication quantifying the second set of similar commands, and/or the first probability to a compute device (e.g., user compute device 130), where the compute device is configured to display the representation of the first feature, the first indication quantifying the first set of similar commands, the second indication quantifying the second set of similar commands, and/or the first probability on a display (e.g., display 136) in response to receiving the signal.

At 605, a second node included in the decision tree and associated with the second feature is identified. The second node is associated with a third set of similar commands, each similar command from the third set of similar commands including the first feature and the second feature. Thus, the set of commands associated with the second node can be similar to the potentially malicious command in the sense that both the set of commands associated with the second node and the potentially malicious command include the first feature and the second feature. The second node is also associated with a fourth set of similar commands from the third set of similar commands that were previously detected. The fourth set of similar commands can be a subset of the third set of similar commands. The second node can be a child node of the first node, such as an intermediate node or a leaf node.

At 606, a second probability that the potentially malicious command will be escalated as potentially malicious is determined based on the third set of similar commands and the fourth set of similar commands. In some implementations, the second probability is determined by using a function that includes dividing a number of commands in the fourth set of similar commands by a number of commands in the third set of similar commands (or vice versa). In some implementations, 606 is performed automatically (e.g., without requiring human input) in response to completing 605.

At 607, at least one of a representation of the second feature, a third indication quantifying the third set of similar commands, a fourth indication quantifying the fourth set of similar commands, or the second probability is caused to be displayed. Causing display can include, for example, sending a signal of the representation of the second feature, the third indication quantifying the third set of similar commands, the fourth indication quantifying the fourth set of similar commands, and/or the second probability to a compute device (e.g., user compute device 130), where the compute device is configured to display the representation of the second feature, the third indication quantifying the third set of similar commands, the fourth indication quantifying the fourth set of similar commands, and/or the second probability on a display (e.g., display 136) in response to receiving the signal.

In some implementations, method 600 further includes causing display of text describing each similar command from the third set of similar commands, the text provided by one or more users. In some implementations, method 600 further includes causing display of text describing each similar command from the fourth set of similar commands, the text provided by one or more users.

In some implementations of method 600, the potentially malicious command further includes a third feature, and method 600 further includes identifying a third node included in the decision tree and associated with the third feature. The third node can be a child node of the second node and associated with (1) a fifth set of similar commands, each similar command from the fifth set of similar commands including the first feature, the second feature, and the third feature, and (2) a sixth set of similar commands from the fifth set of similar commands and that were previously detected. Method 600 can further include determining a third probability that the potentially malicious command will be escalated as potentially malicious based on the fifth set of similar commands and the sixth set of similar commands. Method 600 can further include causing display of at least one of a representation of the third feature, a fifth indication quantifying the fifth set of similar commands, a sixth indication quantifying the sixth set of similar commands, or the third probability.

In some implementations of method 600, the potentially malicious command further includes a third feature and a fourth feature, and method 600 further includes identifying, via the one or more processors, a third node included in the decision tree and associated with the third feature. The third node can be associated with (1) a fifth set of similar commands, each similar command from the fifth set of similar commands including the first feature, the second feature, and the third feature, and (2) a sixth set of similar commands from the fifth set of similar commands and that were previously detected. Method 600 can further include determining a third probability that the potentially malicious command will be escalated as potentially malicious based on the fifth set of similar commands and the sixth set of similar commands.

Method 600 can further include causing display of at least one of a representation of the third feature, a fifth indication quantifying the fifth set of similar commands, a sixth indication quantifying the sixth set of similar commands, or the third probability. Method 600 can further include identifying a fourth node included in the decision tree and associated with the fourth feature. The fourth node can be associated with (1) a seventh set of similar commands, each similar command from the seventh set of similar commands including the first feature, the second feature, the third feature, and the fourth feature, and (2) an eighth set of similar commands from the seventh set of similar commands and that were previously detected. Method 600 can further include determining a fourth probability that the potentially malicious command will be escalated as potentially malicious based on the seventh set of similar commands and the eighth set of similar commands. Method 700 can further include causing display of at least one of a representation of the fourth feature, a seventh indication quantifying the seventh set of similar commands, an eighth indication quantifying the eighth set of similar commands, or the fourth probability.

In some implementations of method 600, the potentially malicious command is a first potentially malicious command and the decision tree is a first decision tree. Method 600 can further include receiving a second potentially malicious command different than the first potentially malicious command, the second potentially malicious command including a third feature and a fourth feature. Method 600 can further include identifying a third node included in a second decision tree, different than the first decision tree, and associated with the third feature. The third node can be associated with (1) a fifth set of similar commands, each similar command from the fifth set of similar commands including the third feature, and (2) a sixth set of similar commands from the fifth set of similar commands and that were previously detected. Method 600 can further include determining a third probability that the second potentially malicious command will be escalated as potentially malicious based on the fifth set of similar commands and the sixth set of similar commands. Method 600 can further include causing display of at least one of a representation of the third feature, a fifth indication quantifying the fifth set of similar commands, a sixth indication quantifying the sixth set of similar commands, or the third probability.

Method 600 can further include identifying, via the one or more processors, a fourth node included in the second decision tree associated with the fourth feature. The fourth node can be associated with (1) a seventh set of similar commands, each similar command from the seventh set of similar commands including the third feature and the fourth feature, and (2) an eighth set of similar commands from the seventh set of similar commands and that were previously detected. Method 600 can further include determining a fourth probability that the second potentially malicious command will be escalated as potentially malicious based on the seventh set of similar commands and the eighth set of similar commands. Method 600 can further include causing display of at least one of a representation of the fourth feature, a seventh indication quantifying the seventh set of similar commands, an eighth indication quantifying the eighth set of similar commands, or the fourth probability.

In some implementations of method 600, the third number is less than the first number, and each similar command from the third set of commands is included in the first set of similar commands.

In some implementations of method 600, the causing display of at least one of the first feature, the first indication quantifying the first set of similar commands, the second indication quantifying the second set of similar commands, or the first probability at 607 includes causing display of the first feature, the first indication quantifying the first set of similar commands, the second indication quantifying the second set of similar commands, and the first probability.

In some implementations of method 600, the decision tree is generated using a plurality of commands. The plurality of commands includes the first set of similar commands and a fifth set of commands different than the first set of similar commands. Each command from the fifth set of commands does not include the first feature or the second feature. Thus, the decision tree can be generated using commands with features not included in the potentially malicious command.

In some implementations, method 600 further includes automatically performing, without requiring user input, at least one remedial action in response to at least one of (1) the second probability being outside a first predetermined range, or (2) the fourth indication being outside a second predetermined range. Performing the at least one remedial action without requiring user input can, in some instances, mitigate and/or prevent negative consequences that can be caused by the potential malicious command faster than a scenario where user input is required. Additionally, performing the at least one remedial action without requiring user input can, in some instances, mitigate and/or prevent negative consequences that otherwise would have been not mitigated and/or not prevented.

Figure 7:
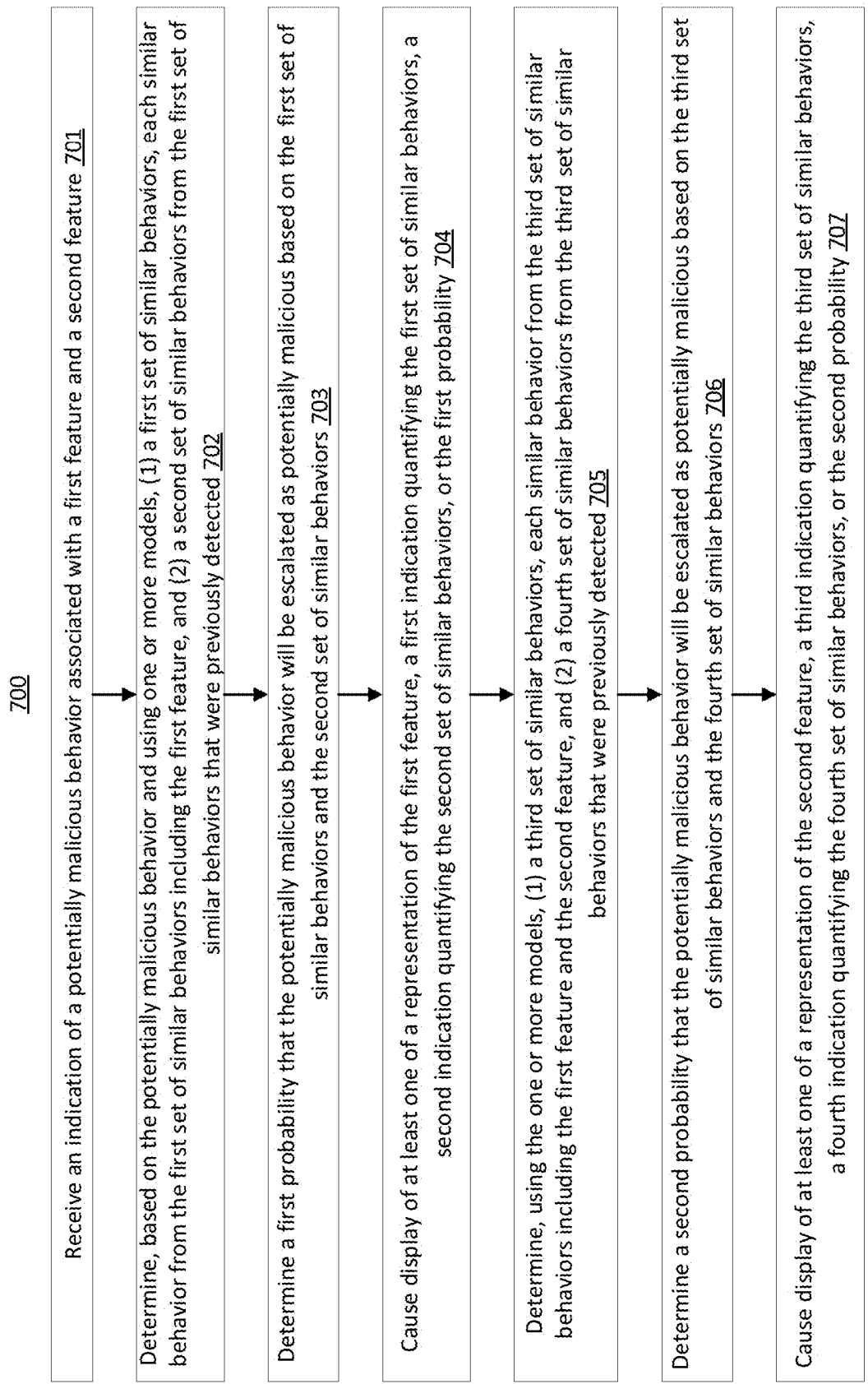
FIG. 7 shows a flowchart of a method for causing display of information associated with a behavior(s) similar to a potentially malicious behavior, according to an embodiment.

FIG. 7 shows a flowchart of a method 700 for causing display of information associated with a behavior(s) similar to a potentially malicious behavior, according to an embodiment. In some implementations, method 700 can be performed by one or more processors (e.g., processor 102 of FIG. 1).

At 701, an indication of a potentially malicious behavior (e.g., potentially malicious command 106) associated with a first feature and a second feature is received. The first feature can be different than the second feature. A representation of the potentially malicious behavior can be received by, for example, the processor 102 of the security operations compute device 100 from the user compute device 130. In some implementations, the potentially malicious behavior is a potentially malicious command and/or potentially malicious command line.

At 702, (1) a first set of similar behaviors, each similar behavior from the first set of similar behaviors including the first feature, and (2) a second set of similar behaviors from the first set of similar behaviors and that were previously detected, are determined based on the potentially malicious behavior and using one or more models (e.g., model(s) 110 of FIG. 1). For example, the one or more models can be used to identify the first set of similar behaviors from a data structure (e.g., set of decision trees 108, a table, a graph, a database, etc.) including multiple behaviors by identifying and selecting behaviors from the multiple behaviors that have the first feature. In some implementations, 702 is performed automatically (e.g., without requiring human input) in response to completing 701.

At 703, a first probability that the potentially malicious behavior will be escalated as potentially malicious is determined based on the first set of similar behaviors and the second set of similar behaviors. In some implementations, the first probability is determined by using a function that includes dividing a number of behaviors in the second set of similar behaviors by a number of behaviors in first set of similar behaviors (or vice versa). In some implementations, 703 is performed automatically (e.g., without requiring human input) in response to completing 702.

At 704, at least one of a representation of the first feature, a first indication quantifying the first set of similar behaviors, a second indication quantifying the second set of similar behaviors, or the first probability is caused to be displayed. Causing display can include, for example, sending a signal of the representation of the first feature, the first indication quantifying the first set of similar behaviors, the second indication quantifying the second set of similar behaviors, and/or the first probability to a compute device (e.g., user compute device 130 of FIG. 1), where the compute device is configured to display the representation of the first feature, the first indication quantifying the first set of similar behaviors, the second indication quantifying the second set of similar behaviors, and/or the first probability on a display (e.g., display 136 of FIG. 1) in response to receiving the signal.

At 705, a third set of similar behaviors are determined using the one or more models, each similar behavior from the third set of similar behaviors including the first feature and the second feature. A fourth set of similar behaviors from the third set of similar behaviors and that were previously detected are also determined using the one or more models. For example, the one or more models can be used to identify the third set of similar behaviors from a data structure (e.g., set of decision trees 108, a table, a graph, a database, etc.) including multiple behaviors by identifying and selecting behaviors from the multiple behaviors that have the first feature and the second feature. Additionally or alternatively, the one or more models can be used to identify the third set of similar behaviors from the first set of similar behaviors by identifying and selecting behaviors from the first set of behaviors that have the second feature (e.g., without analyzing for first feature).

At 706, a second probability that the potentially malicious behavior will be escalated as potentially malicious is determined based on the third set of similar behaviors and the fourth set of similar behaviors. In some implementations, the second probability is determined by using a function that includes dividing a number of behaviors in the fourth set of similar behaviors by a number of behaviors in third set of similar behaviors (or vice versa). In some implementations, 706 is performed automatically (e.g., without requiring human input) in response to completing 705.

At 707, at least one of a representation of the second feature, a third indication quantifying the third set of similar behaviors, a fourth indication quantifying the fourth set of similar behaviors, or the second probability is caused to be displayed. Causing display can include, for example, sending a signal of the representation of the second feature, the third indication quantifying the third set of similar behaviors, the fourth indication quantifying the fourth set of similar behaviors, and/or the second probability to a compute device (e.g., user compute device 130 of FIG. 1), where the compute device is configured to display the representation of the second feature, the third indication quantifying the third set of similar behaviors, the fourth indication quantifying the fourth set of similar behaviors, and/or the second probability on a display (e.g., display 136 of FIG. 1) in response to receiving the signal.

In some implementations, method 700 includes causing display of the at least one of the first feature, the first indication quantifying the first set of similar behaviors, the second indication quantifying the second set of similar behaviors, or the first probability to a first user. Method 700 can also include causing display of the at least one of the second feature, the third indication quantifying the third set of similar behaviors, the fourth indication quantifying the fourth set of similar behaviors, or the second probability to the first user. Method 700 can further include receiving text describing at least one similar behavior from the third set of similar behaviors and provided by a second user different than the first user. The method 700 can further include causing display of the text to the first user.

In some implementations, method 700 includes causing display of the at least one of the first feature, the first indication quantifying the first set of similar behaviors, the second indication quantifying the second set of similar behaviors, or the first probability to a first user. Method 700 can also include causing display of the at least one of the second feature, the third indication quantifying the third set of similar behaviors, the fourth indication quantifying the fourth set of similar behaviors, or the second probability to the first user. Method 700 can further include receiving text describing at least one similar behavior from the fourth set of similar behaviors and provided by a second user different than the first user. The method 700 can further include causing display of the text to the first user.

In some implementations of method 700, the potentially malicious behavior further includes a third feature, and method 700 can further include determining (1) a fifth set of similar behaviors, each similar behavior from the fifth set of similar behaviors including the first feature, the second feature, and the third feature, and (2) a sixth set of similar behaviors from the fifth set of similar behaviors that were previously detected. Method 700 can further include determining a third probability that the potentially malicious behavior will be escalated based on the fifth set of similar behaviors and the sixth set of similar behaviors. Method 700 can further include causing display of at least one of a representation of the third feature, a fifth indication quantifying the fifth set of similar behaviors, a sixth indication quantifying the sixth set of similar behaviors, or the third probability.

In some implementations of method 700, the potentially malicious behavior further includes a third feature and a fourth feature, and method 700 can further include determining, using the one or more models, (1) a fifth set of similar behaviors, each similar behavior from the fifth set of similar behaviors including the first feature, the second feature, and the third feature, and (2) a sixth set of similar behaviors from the fifth set of similar behaviors and that were previously detected. Method 700 can further include determining a third probability that the potentially malicious behavior will be escalated as potentially malicious based on the fifth set of similar behaviors and the sixth set of similar behaviors. Method 700 can further include causing display of at least one of a representation of the third feature, a fifth indication quantifying the fifth set of similar behaviors, a sixth indication quantifying the sixth set of similar behaviors, or the third probability. Method 700 can further include determining, using the one or more models, (1) a seventh set of similar behaviors, each similar behavior from the seventh set of similar behaviors including the first feature, the second feature, the third feature, and the fourth feature, and (2) an eighth set of similar behaviors from the seventh set of similar behaviors and that were detected. Method 700 can further include determining a fourth probability that the potentially malicious behavior will be escalated as potentially malicious based on the seventh set of similar behaviors and the eighth set of similar behaviors. Method 700 can further include causing display of at least one of a representation of the fourth feature, a seventh indication quantifying the seventh set of similar behaviors, an eighth indication quantifying the eight set of similar behaviors, or the fourth probability.

In some implementations, method 700 further includes automatically performing, without requiring user input, at least one remedial action in response to at least one of (1) the second probability being outside a first predetermined range, or (2) the fourth indication being outside a second predetermined range. Performing the at least one remedial action without requiring user input can, in some instances, mitigate and/or prevent negative consequences that can be caused by the potential malicious behavior faster than a scenario where user input is required. Additionally, performing the at least one remedial action without requiring user input can, in some instances, mitigate and/or prevent negative consequences that otherwise would not have been mitigated and/or prevented.

FIG. 8 shows a flowchart of a method 800 for causing display of information associated with a command(s) similar to a potentially malicious command, according to an embodiment. In some implementations, method 800 can be performed by one or more processors (e.g., processor 102 of FIG. 1).

At 801, a potentially malicious command (e.g., potentially malicious command 106) including a plurality of features is received. In some implementations, each feature from the plurality of features can be different than the remaining features from the plurality of features. A representation of the potentially malicious command can be received by, for example, the processor 102 of the security operations compute device 100 from the user compute device 130 (as shown in FIG. 1). In some implementations, the potentially malicious command is a potentially malicious command line. At 802, a plurality of nodes included in a decision tree (e.g., a decision tree from the set of decision trees 108 of FIG. 1, decision tree 140 of FIG. 2, etc.) are traversed, based on the plurality of features, to identify a leaf node included in the plurality of nodes. The leaf node is associated with (1) a first set of similar commands, each similar command from the first set of similar commands including the plurality of features, and (2) a second set of similar commands from the first set of similar commands and that were previously detected. At 803, a probability that the potentially malicious command will be escalated as potentially malicious is determined based on the first set of similar commands and the second set of similar commands. At 804, a first indication quantifying the first set of similar commands, a second indication quantifying the second set of similar commands, and the probability is caused to be displayed.

In some implementations of method 800, 802 is performed automatically (e.g., without requiring human input) in response to completing 801, 803 is performed automatically (e.g., without requiring human input) in response to completing 802, and/or 804 is performed automatically (e.g., without requiring human input) in response to completing 803.

In some implementations, method 800 further includes causing display of a similar command from at least one of the first set of similar commands or the second set of similar commands without displaying user-provided notes associated the similar command. Method 800 can further include receiving an indication to display user-provided notes associated with the similar command. Method 800 can further include causing display of the user-provided notes.

In some implementations, method 800 further includes updating the plurality of nodes such that each node from the plurality of nodes is further associated with the potentially malicious command.

In some implementations of method 800, the decision tree is trained to be traversed using a greedy algorithm.

It should be understood that the disclosed embodiments are not intended to be exhaustive, and functional, logical, operational, organizational, structural and/or topological modifications may be made without departing from the scope of the disclosure. As such, all examples and/or embodiments are deemed to be non-limiting throughout this disclosure.

All definitions, as defined and used herein, should be understood to control over dictionary definitions, definitions in documents incorporated by reference, and/or ordinary meanings of the defined terms.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of" "only one of," or "exactly one of" "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. A method, comprising:
   receiving, via one or more processors, a potentially malicious command including a first feature and a second feature;
   identifying, via the one or more processors, a first node that is included in a decision tree and associated with the first feature, the first node associated with (1) a first set of similar commands, each similar command from the first set of similar commands including the first feature, and (2) a second set of similar commands from the first set of similar commands that were previously detected;

determining, via the one or more processors, a first probability that the potentially malicious command will be escalated as potentially malicious based on the first set of similar commands and the second set of similar commands;

causing, via the one or more processors, display of at least one of a representation of the first feature, a first indication quantifying the first set of similar commands, a second indication quantifying the second set of similar commands, or the first probability;

determining, via the one or more processors, that the first node does not include a child node associated with the second feature;

generating, via the one or more processors and in response to determining that the first node does not include the child node associated with the second feature, a second node (1) at the decision tree, (2) associated with the second feature and (3) being a child node of the first node, the second node configured to be associated with (1) a third set of similar commands, each similar command from the third set of similar commands including the first feature and the second feature, and (2) a fourth set of similar commands from the third set of similar commands that were previously detected;

determining, via the one or more processors, a second probability that the potentially malicious command will be escalated as potentially malicious based on the third set of similar commands and the fourth set of similar commands;

causing, via the one or more processors, display of at least one of a representation of the second feature, a third indication quantifying the third set of similar commands, a fourth indication quantifying the fourth set of similar commands, or the second probability; and automatically performing, via the one or more processors and without requiring user input, at least one remedial action in response to at least one of (1) the second probability being outside a first predetermined range, or (2) the fourth indication being outside a second predetermined range.

2. The method of claim 1, further comprising:
causing, via the one or more processors, display of text describing each similar command from the third set of similar commands, the text provided by one or more users.

3. The method of claim 1, further comprising:
causing, via the one or more processors, display of text describing each similar command from the fourth set of similar commands, the text provided by one or more users.

4. The method of claim 1, wherein the potentially malicious command further includes a third feature, the method further comprising:

identifying, via the one or more processors, a third node included in the decision tree and associated with the third feature, the third node being a child node of the second node and associated with (1) a fifth set of similar commands, each similar command from the fifth set of similar commands including the first feature, the second feature, and the third feature, and (2) a sixth set of similar commands from the fifth set of similar commands that were previously detected;

determining, via the one or more processors, a third probability that the potentially malicious command will be escalated as potentially malicious based on the fifth set of similar commands and the sixth set of similar commands; and causing, via the one or more processors, display of at least one of a representation of the third feature, a fifth indication quantifying the fifth set of similar commands, a sixth indication quantifying the sixth set of similar commands, or the third probability.

5. The method of claim 1, wherein the potentially malicious command further includes a third feature and a fourth feature, the method further comprising:

identifying, via the one or more processors, a third node included in the decision tree and associated with the third feature, the third node associated with (1) a fifth set of similar commands, each similar command from the fifth set of similar commands including the first feature, the second feature, and the third feature, and (2) a sixth set of similar commands from the fifth set of similar commands that were previously detected;

determining, via the one or more processors, a third probability that the potentially malicious command will be escalated as potentially malicious based on the fifth set of similar commands and the sixth set of similar commands;

causing, via the one or more processors, display of at least one of a representation of the third feature, a fifth indication quantifying the fifth set of similar commands, a sixth indication quantifying the sixth set of similar commands, or the third probability;

identifying, via the one or more processors, a fourth node included in the decision tree and associated with the fourth feature, the fourth node associated with (1) a seventh set of similar commands, each similar command from the seventh set of similar commands including the first feature, the second feature, the third feature, and the fourth feature, and (2) an eighth set of similar commands from the seventh set of similar commands that were previously detected;

determining, via the one or more processors, a fourth probability that the potentially malicious command will be escalated as potentially malicious based on the seventh set of similar commands and the eighth set of similar commands; and causing, via the one or more processors, display of at least one of a representation of the fourth feature, a seventh indication quantifying the seventh set of similar commands, an eighth indication quantifying the eighth set of similar commands, or the fourth probability.

6. The method of claim 1, wherein the potentially malicious command is a first potentially malicious command and the decision tree is a first decision tree, the method further comprising:

receiving, via one or more processors, a second potentially malicious command different than the first potentially malicious command, the second potentially malicious command including a third feature and a fourth feature;

identifying, via the one or more processors, a third node included in a second decision tree, different than the first decision tree, and associated with the third feature, the third node associated with (1) a fifth set of similar commands, each similar command from the fifth set of similar commands including the third feature, and (2) a sixth set of similar commands from the fifth set of similar commands that were previously detected;

determining, via the one or more processors, a third probability that the second potentially malicious command will be escalated as potentially malicious based on the fifth set of similar commands and the sixth set of similar commands;

causing, via the one or more processors, display of at least one of a representation of the third feature, a fifth indication quantifying the fifth set of similar commands, a sixth indication quantifying the sixth set of similar commands, or the third probability;

identifying, via the one or more processors, a fourth node included in the second decision tree associated with the fourth feature, the fourth node associated with (1) a seventh set of similar commands, each similar command from the seventh set of similar commands including the third feature and the fourth feature, and (2) an eighth set of similar commands from the seventh set of similar commands that were previously detected;

determining, via the one or more processors, a fourth probability that the second potentially malicious command will be escalated as potentially malicious based on the seventh set of similar commands and the eighth set of similar commands; and causing, via the one or more processors, display of at least one of a representation of the fourth feature, a seventh indication quantifying the seventh set of similar commands, an eighth indication quantifying the eighth set of similar commands, or the fourth probability.

7. The method of claim 1, wherein the third set of similar commands has less commands than the first set of similar commands, and each command from the third set of similar commands is included in the first set of similar commands.

8. The method of claim 1, wherein the causing, via the one or more processors, display of at least one of the representation of the first feature, the first indication quantifying the first set of similar commands, the second indication quantifying the second set of similar commands, or the first probability includes causing, via the one or more processors, display of the representation of the first feature, the first indication quantifying the first set of similar commands, the second indication quantifying the second set of similar commands, and the first probability.

9. The method of claim 1, wherein the decision tree is generated using a plurality of commands, the plurality of commands including the first set of similar commands and a fifth set of commands different than the first set of similar commands, each command from the fifth set of commands not including the first feature nor the second feature.

10. The method of claim 1, wherein the first set of similar commands includes at least one similar command not having the second feature.

11. The method of claim 1, wherein the first node is associated with a first set of features that includes the first feature, the second node is associated with a second set of features that include the first feature and the second feature, and the first set of features includes at least one less feature than the second set of features.

12. An apparatus, comprising:
a memory including processor-executable instructions; and
one or more hardware processors in communication with the memory that, having executed the processor-executable instructions, are configured to:
receive an indication of a potentially malicious behavior associated with a first feature and a second feature;
determine, based on the potentially malicious behavior and using one or more models, (1) a first set of similar behaviors associated with a first node, each similar behavior from the first set of similar behaviors including the first feature, and (2) a second set of similar behaviors from the first set of similar behaviors that were previously detected;
determine a first probability that the potentially malicious behavior will be escalated as potentially malicious by dividing a count of the first set of similar behaviors and a count of the second set of similar behaviors;
cause display of at least one of a representation of the first feature, a first indication quantifying the first set of similar behaviors, a second indication quantifying the second set of similar behaviors, or the first probability;
determine that the first node does not include a child node associated with the second feature;
in response to determining that the first node does not include the child node associated with the second feature, generate a second node that is the child node;
determine, using the one or more models, (1) a third set of similar behaviors associated with the second node, each similar behavior from the third set of similar behaviors including the first feature and the second feature, and (2) a fourth set of similar behaviors from the third set of similar behaviors that were previously detected;
determine a second probability that the potentially malicious behavior will be escalated as potentially malicious based on the third set of similar behaviors and the fourth set of similar behaviors;
cause display of at least one of a representation of the second feature, a third indication quantifying the third set of similar behaviors, a fourth indication quantifying the fourth set of similar behaviors, or the second probability; and
automatically perform, without requiring user input, at least one remedial action in response to at least one of (1) the second probability being outside a first predetermined range, or (2) the fourth indication being outside a second predetermined range.

13. The apparatus of claim 12, wherein:
the one or more hardware processors are configured to cause display of the at least one of the representation of the first feature, the first indication quantifying the first set of similar behaviors, the second indication quantifying the second set of similar behaviors, or the first probability to a first user;
the one or more hardware processors are configured to cause display of the at least one of the representation of the second feature, the third indication quantifying the third set of similar behaviors, the fourth indication quantifying the fourth set of similar behaviors, or the second probability to the first user; and
the one or more hardware processors are further configured to:
receive text describing at least one similar behavior from the third set of similar behaviors, the text provided by a second user different than the first user; and
cause display of the text to the first user.

14. The apparatus of claim 12, wherein:
the one or more hardware processors are configured to cause display of the at least one of the representation of the first feature, the first indication quantifying the first set of similar behaviors, the second indication quantifying the second set of similar behaviors, or the first probability to a first user;

the one or more hardware processors are configured to cause display of the at least one of the representation of the second feature, the third indication quantifying the third set of similar behaviors, the fourth indication quantifying the fourth set of similar behaviors, or the second probability to the first user; and the one or more hardware processors are further configured to:
receive text describing at least one similar behavior from the fourth set of similar behaviors, the text provided by a second user different than the first user; and
cause display of the text to the first user.

15. The apparatus of claim 12, wherein the potentially malicious behavior further includes a third feature, and the one or more hardware processors are further configured to:
determine, using the one or more models, (1) a fifth set of similar behaviors, each similar behavior from the fifth set of similar behaviors including the first feature, the second feature, and the third feature, and (2) a sixth set of similar behaviors from the fifth set of similar behaviors that were previously detected;
determine a third probability that the potentially malicious behavior will be escalated based on the fifth set of similar behaviors and the sixth set of similar behaviors; and
cause display of at least one of a representation of the third feature, a fifth indication quantifying the fifth set of similar behaviors, a sixth indication quantifying the sixth set of similar behaviors, or the third probability.

16. The apparatus of claim 12, wherein the potentially malicious behavior further includes a third feature and a fourth feature, and the one or more hardware processors are further configured to:
determine, using the one or more models, (1) a fifth set of similar behaviors, each similar behavior from the fifth set of similar behaviors including the first feature, the second feature, and the third feature, and (2) a sixth set of similar behaviors from the fifth set of similar behaviors that were previously detected;
determine a third probability that the potentially malicious behavior will be escalated as potentially malicious based on the fifth set of similar behaviors and the sixth set of similar behaviors;
cause display of at least one of a representation of the third feature, a fifth indication quantifying the fifth set of similar behaviors, a sixth indication quantifying the sixth set of similar behaviors, or the third probability;
determine, using the one or more models, (1) a seventh set of similar behaviors, each similar behavior from the seventh set of similar behaviors including the first feature, the second feature, the third feature, and the fourth feature, and (2) an eighth set of similar behaviors from the seventh set of similar behaviors that were detected;
determine a fourth probability that the potentially malicious behavior will be escalated as potentially malicious based on the seventh set of similar behaviors and the eighth set of similar behaviors; and
cause display of at least one of a representation of the fourth feature, a seventh indication quantifying the seventh set of similar behaviors, an eighth indication quantifying the eighth set of similar behaviors, or the fourth probability.

17. A non-transitory processor-readable medium storing code representing instructions to be executed by one or more processors, the instructions comprising code to cause the one or more processors to:
receive a potentially malicious command including a plurality of features;
traverse, based on the plurality of features, a plurality of nodes included in a decision tree to identify a leaf node included in the plurality of nodes, the leaf node associated with (1) a first set of similar commands, each similar command from the first set of similar commands including the plurality of features, and (2) a second set of similar commands from the first set of similar commands that were previously detected, the plurality of nodes including a first node associated with a first set of features from the plurality of features and a second node that is (1) a child node of the first node and (2) associated with a second set of features from the plurality of features, the first set of features including at least one less feature than the second set of features;
determine a probability that the potentially malicious command will be escalated as potentially malicious by dividing a count of the first set of similar commands and a count of the second set of similar commands;
cause display of a first indication quantifying the first set of similar commands, a second indication quantifying the second set of similar commands, and the probability; and
automatically perform, without user input, at least one remedial action in response to the probability being outside a predetermined range.

18. The non-transitory processor-readable medium of claim 17, wherein the instructions further comprise code to cause the one or more processors to:
cause display of a similar command from at least one of the first set of similar commands or the second set of similar commands without displaying user-provided notes associated with the similar command;
receive an indication to display the user-provided notes associated with the similar command; and
cause display of the user-provided notes.

19. The non-transitory processor-readable medium of claim 17, wherein the instructions further comprise code to cause the one or more processors to:
update the plurality of nodes such that each node from the plurality of nodes is further associated with the potentially malicious command.

20. The non-transitory processor-readable medium of claim 17, wherein the decision tree is trained to be traversed using a greedy algorithm.

* * * * *